United States Patent
Kusuura et al.

(10) Patent No.: US 9,926,463 B2
(45) Date of Patent: Mar. 27, 2018

(54) DYNAMIC SURFACES

(71) Applicant: EMPIRE TECHNOLOGY DEVELOPMENT LLC, Wilmington, DE (US)

(72) Inventors: Takahisa Kusuura, Kawasaki (JP); Michael Keoni Manion, Cronulla (AU); Feng Wan, Issaquah, WA (US); Timothy Martin Londergan, Seattle, WA (US); Vincenzo Casasanta, III, Woodinville, WA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 109 days.

(21) Appl. No.: 14/781,551

(22) PCT Filed: Apr. 2, 2013

(86) PCT No.: PCT/US2013/035034
§ 371 (c)(1),
(2) Date: Sep. 30, 2015

(87) PCT Pub. No.: WO2014/163626
PCT Pub. Date: Oct. 9, 2014

(65) Prior Publication Data
US 2016/0040030 A1    Feb. 11, 2016

(51) Int. Cl.
| C09D 153/00 | (2006.01) |
| C09D 5/32 | (2006.01) |
| C08L 33/08 | (2006.01) |
| B05D 5/08 | (2006.01) |
| B08B 17/02 | (2006.01) |
| C09D 7/12 | (2006.01) |
| C08K 3/08 | (2006.01) |
| C08K 3/22 | (2006.01) |

(52) U.S. Cl.
CPC .......... C09D 153/00 (2013.01); B05D 5/08 (2013.01); B08B 17/02 (2013.01); C08L 33/08 (2013.01); C09D 5/32 (2013.01); C09D 7/12 (2013.01); C09D 7/1216 (2013.01); C09D 7/1266 (2013.01); C09D 7/1291 (2013.01); C08K 2003/0831 (2013.01); C08K 2003/2275 (2013.01)

(58) Field of Classification Search
CPC ............................ C09D 5/32; C09D 153/00
See application file for complete search history.

(56) References Cited

U.S. PATENT DOCUMENTS

| 6,001,536 A | 12/1999 | Vermeersch et al. |
| 6,271,300 B1 | 8/2001 | Ohsumi et al. |
| 6,302,878 B1* | 10/2001 | Daikuzono .......... A61N 5/0601 606/15 |
| 6,447,897 B1 | 9/2002 | Linag et al. |
| 6,482,890 B2 | 11/2002 | Kiyohara et al. |
| 7,323,288 B2 | 1/2008 | Yu et al. |
| 7,371,457 B2 | 5/2008 | Oldenburgt et al. |
| 7,544,462 B2 | 6/2009 | Levanon et al. |
| 7,803,432 B2 | 9/2010 | Takahashi et al. |
| 7,923,106 B2 | 4/2011 | Gartstein et al. |
| 8,062,738 B2 | 11/2011 | Yoon et al. |
| 2003/0219889 A1* | 11/2003 | Sumaru .................. C12M 47/04 435/287.1 |
| 2007/0202263 A1 | 8/2007 | Kitamura et al. |
| 2009/0226648 A1 | 9/2009 | Wild et al. |
| 2010/0027118 A1 | 2/2010 | Rosenman et al. |
| 2011/0008628 A1 | 1/2011 | Fujita et al. |
| 2011/0250409 A1 | 10/2011 | Marte et al. |
| 2013/0034552 A1 | 2/2013 | Chaikof et al. |

FOREIGN PATENT DOCUMENTS

| JP | 2002012817 A | 1/2002 |
| JP | 2009203316 A | 9/2009 |
| JP | 2011195633 A | 10/2011 |

OTHER PUBLICATIONS

"Super-Hydrophobic Nano Coating—New Technology," accessed at http://www.azonano.com/article.aspx?ArticleID=342, posted on Dec. 11, 2003, pp. 1-2.
Böhmer, M.R., et al., "Preparation of monodisperse polymer particles and capsules by ink-jet printing," Colloids and Surfaces A: Physicochemical and Engineering Aspects, vol. 289, Issues 1-3, pp. 96-104 (Oct. 15, 2006).
Blanco-Lomas, M., et al., "Reversible Photocontrol of Peptide Conformation with a Rhodopsin-like Photoswitch," Journal of the American Chemical Society, vol. 134, No. 16, pp. 6960-6963 (Apr. 6, 2012).
Cavalieri, F., et al., "Stable Polymeric Microballoons as Multifunctional Device for Biomedical Uses: Synthesis and Characterization," Langmuir, vol. 21, Issue 19, pp. 8758-8764 (Sep. 2005).
Cui, W., et al., "Preparation and evaluation of poly(L-lactide-co-glycolide) (PLGA) microbubbles as a contrast agent for myocardial contrast echocardiography," Journal of Biomedical Materials Research Part 8—Applied Biomaterials, vol. 73 B, Issue 1, pp. 171-178 (Apr. 2005).
Feng, X., et al., "Reversible Super-hydrophobicity to Super-hydrophilicity Transition of Aligned ZnO Nanorod Films," Journal of American Chemical Society, vol. 126, No. 1, pp. 62-63 (2004).
International Search Report and Written Opinion for International Application No. PCT/US13/35034 dated Jul. 9, 2015.

(Continued)

Primary Examiner — Vickey Nerangis
(74) Attorney, Agent, or Firm — Dorsey & Whitney LLP

(57) ABSTRACT

Compositions and methods for changing a property of a coating are provided. The coating includes a dynamic material configured to be reversibly convertible between a hydrophobic state and a hydrophilic state, wherein transition between the hydrophilic state to the hydrophobic state occurs in an environment dependent manner. The coating also includes an environment altering material configured to alter the hydrophobic or hydrophilic state of the dynamic material.

9 Claims, 9 Drawing Sheets

(56) References Cited

OTHER PUBLICATIONS

Kanaoka, S., et al., "Thermosensitive Gold Nanoclusters Stabilized by Well-Defined Vinyl Ether Star Polymers: Reusable and Durable Catalysts for Aerobic Alcohol Oxidation," Journal of American chemical society, vol. 129, No. 40, pp. 12060-12061 (2007).

Kono, K., et al., "Preparation of Temperature-Sensitive Liposomes for Delivery of Anticancer Drugs by Use of Thermosensitive Amphiphilic Block Copolymer," Annual Meeting, International Medical Center of Japan, pp. 1-4 (2006).

Kono, K., et al., "Temperature sensitization of liposomes by use of thermosensitive block copolymers synthesized by living cationic polymerization: effect of copolymer chain length," Bioconjug Chem., vol. 16, No. 6, pp. 1367-1374 (Nov.-Dec. 2005).

Kumar, V., et al., "Microwave Absorption Studies on Cobalt Iron Nano-Alloys," pp. 4 (2008).

Lungu, O.I., et al., "Designing Photoswitchable Peptides Using the AsLOV2 Domain," Chemistry & Biology, vol. 19, No. 4, pp. 507-517 (Apr. 20, 2012).

Mornet, S., et al., "Magnetic nanoparticle design for medical diagnosis and therapy," Journal of Material Chemistry, vol. 14, pp. 2161-2175 (2004).

Paton, K.R., and Windle, A.H., "Efficient microwave energy absorption by carbon nanotubes," Carbon, vol. 46, Issue 14, pp. 1935-1941 (Nov. 2008).

Phillips, J.L., "A Topical Review of Magnetic Fluid Hyperthermia," accessed at https://web.archive.org/web/20100614042050/http://www.bama.ua.edu/~joshua/archive/aug05/Jennifer%20Phillips.pdf, accessed on Sep. 30, 2014, pp. 5.

Pissuwan, D., et al., "Therapeutic possibilities of plasmonically heated gold nanoparticles," Trends in biotechnology, vol. 24, Issue 2, pp. 62-67 (Feb. 2006).

Sirsi, S., and Borden, M., "Microbubble Compositions, Properties and Biomedical Applications," Bubble Science Eng Technology, vol. 1, Issue 1-2, pp. 3-17 (Nov. 2009).

"Sunlight," accessed at https://web.archive.org/web/20130314213553/http://en.wikipedia.org/wiki/Sunlightt, last modified on Mar. 13, 2013, pp. 8.

Tsujimoto, H., "Smart films obtained from block copolymers of various vinyl ethers: Primary structures of polymers and controlled surface responsiveness" POLY 75, accessed at http://oasys2.confex.com/acs/237nm/techprogram/P1249962.HTM, Mar. 22, 2009, p. 1.

\* cited by examiner

DYNAMIC SURFACES

CROSS REFERENCE TO RELATED APPLICATIONS

This application is a U.S. National Stage filing under 35 U.S.C. § 371 of International Application No. PCT/US2013/035034, filed on Apr. 2, 2013, entitled "DYNAMIC SURFACES," the entirety of which is incorporated herein by reference.

REFERENCE TO SEQUENCE LISTING

The present application is being filed along with a Sequence Listing in electronic format. The Sequence Listing is provided as a file entitled revised_SeqList_LLLCB-127NP.TXT, created on Sep. 16, 2015, which is 15,386 bytes in size. The information in the electronic format of the Sequence Listing is incorporated herein by reference in its entirety.

FIELD

The present application relates generally to hydrophilic and hydrophobic switchable surfaces.

BACKGROUND

Hydrophilic materials can have a tendency to interact with or be dissolved by water and other polar substances. There are a variety of hydrophilic materials that can be used as coatings on various objects. Items having these coatings can thereby have a self-cleaning quality. In contrast, hydrophobic materials can have a tendency to minimize any interaction with water or other polar substances.

SUMMARY

In some embodiments, a composition for coating a surface is provided. The composition includes at least one dynamic material. The dynamic material is configured to be reversibly convertible between a hydrophobic state and a hydrophilic state. The transition between the hydrophilic state to the hydrophobic state occurs in a heat dependent manner. The composition also includes at least one heat generating material. The heat generating material is configured to absorb an amount of energy and to convert at least some of the amount of energy to heat.

In some embodiments, a method of changing a property of a coating is provided. The method includes providing a coating including a dynamic material, a heat generating material, and a resin containing the dynamic material and the heat generating material. The dynamic material can be configured to be reversibly convertible between a hydrophobic state and a hydrophilic state. The heat generating material can be configured to absorb an amount of energy and to convert at least some of the amount of energy to heat.

In some embodiments, a method of cleaning a surface is provided. The method includes providing a coating. The coating includes a dynamic material and a heat generating material. The dynamic material is configured to be reversibly convertible between a hydrophobic state and a hydrophilic state. The heat generating material is configured to absorb an amount of energy and to convert at least some of the amount of energy to heat. The method also includes providing moisture to a surface of the coating. The method also includes providing sufficient energy to the heat generating material coating for a sufficient duration such that the heat generating material provides sufficient heat to the dynamic material to change the dynamic material from a hydrophilic state to a hydrophobic state.

In some embodiments a method of making a coating is provided. The method includes supplying a dynamic material, wherein the dynamic material is configured to be reversibly convertible between a hydrophobic state and a hydrophilic state. The method also includes supplying a heat generating material, wherein the heat generating material is configured to absorb an amount of energy and to convert at least some of the amount of energy to heat. The method also includes combining the dynamic material with a sufficient amount of the heat generating material into a combined product such that energy supplied to the combined product produces sufficient heat in the combined product to change the dynamic material from a hydrophilic state to a hydrophobic state.

In some embodiments, a kit is provided. The kit includes a dynamic material. The dynamic material is configured to be reversibly convertible between a hydrophobic state and a hydrophilic state, wherein transition between the hydrophilic state to the hydrophobic state occurs in a heat dependent manner. The kit also includes a heat generating material. The heat generating material is configured to absorb an amount of energy and to convert at least some of the amount of energy to heat. The kit also includes an energy source.

In some embodiments, a coating is provided. The coating includes a base material and a dynamic material distributed over the base material. The dynamic material is configured to be reversibly convertible between a hydrophobic state and a hydrophilic state. The transition between the hydrophilic state to the hydrophobic state occurs in a heat dependent manner.

In some embodiments, a composition for coating a surface is provided. The composition includes at least one dynamic material. The dynamic material is configured to be reversibly convertible between a hydrophobic state and a hydrophilic state. The transition between the hydrophilic state to the hydrophobic state occurs in an environment dependent manner.

In some embodiments a kit is provided. The kit includes a dynamic material configured to be reversibly convertible between a hydrophobic state and a hydrophilic state, wherein transition between the hydrophilic state to the hydrophobic state occurs in an environment dependent manner. The kit also includes an environment altering material configured to alter the hydrophobic or hydrophilic state of the dynamic material. The kit also includes an energy source.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
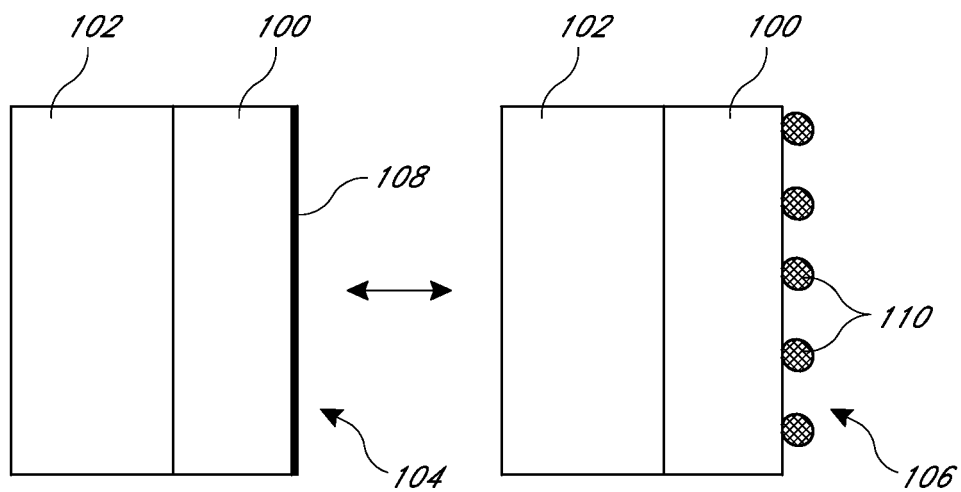
FIG. 1 is a drawing depicting a composition for coating a surface according to some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Provided herein are compositions and methods for reversibly changing the surface characteristics of a coating or any surface generally. The transition of the surface can be between a hydrophobic to a hydrophilic state. When in a hydrophobic state, the surface can repel water or other polar substances. In contrast, when in a hydrophilic state, the surface can attract water or other polar substances. The compositions for the surface (such as a coating or paint) can include a dynamic material that can change from hydrophilic to hydrophobic by changing an environmental aspect of the material. For example, in some embodiments, changes in heat, pH, ultrasound energy, and/or magnetic fields can induce the switch between the two states.

In some embodiments, the compositions described herein can be used as coatings to clean, or assist in cleaning, an item that they coat. As described in detail below, the composition can undergo a change in environment (for example, a change in heat, pH, or magnetic field), causing the composition to change from a hydrophobic to a hydrophilic state. In the hydrophilic state, a liquid film will form on the surface when water (or other polar solvent) is applied to the surface, allowing dirt or other contaminants to be washed away. The composition can then undergo a change in environment (for example, the opposite change in heat, pH, or magnetic field) to transition to a hydrophobic state, thereby drying, or assisting in drying, the cleaned surface.

FIG. 1 depicts some embodiments of a composition 100 for coating a surface 102. As shown in FIG. 1, the composition can be reversibly convertible between a hydrophilic state 104 and a hydrophobic state 106. In the hydrophilic state 104, a film of water 108 can form on the coating. In a hydrophobic state 106, as the coating repels the water, the film of water 108 can form beads of water 110.

In some embodiments, the composition 100 includes at least one dynamic material (not shown). The dynamic material can be configured to be reversibly convertible between a hydrophobic state and a hydrophilic state. In some embodiments, the transition between the hydrophilic state and the hydrophobic state can occur in a heat dependent manner. In some embodiments, the composition 100 includes at least one heat generating material (not shown). The heat generating material can be configured to absorb an amount of energy and to convert at least some of the amount of energy to heat. In some embodiments, the composition 100 can further include at least one resin (not shown). The resin can be any of a number of common materials. For example, the resin can include materials used for paints, such as an aqueous polyurethane resin composition. The resin can assist in keeping the heat generating material distributed and/or in proximity to the dynamic material. In some embodiments, the resin simply acts as a layer to contain the dynamic material.

Figure 2:
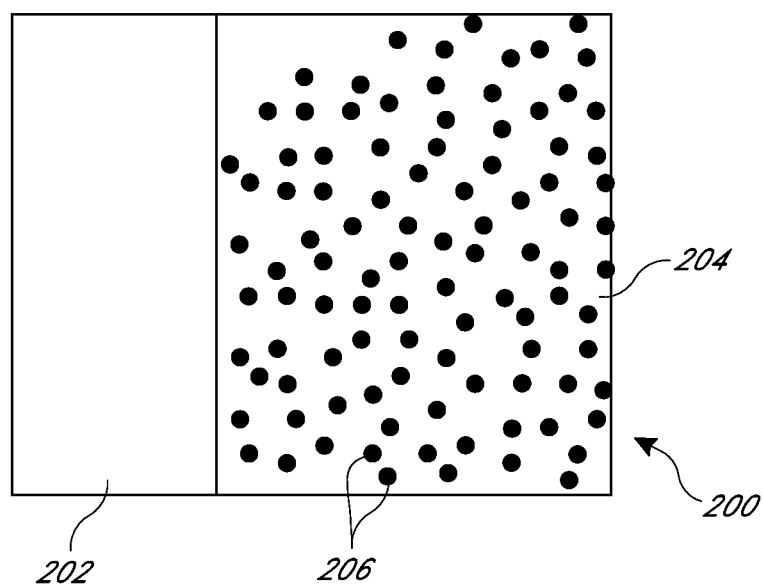
FIG. 2 is a drawing depicting a composition for coating a surface according to some embodiments.

FIG. 2 depicts some embodiments of a composition 200 for coating a surface 202 (such as a base material) that includes a resin 204. The resin 204 includes a dynamic material configured to be reversibly convertible between a hydrophobic state and a hydrophilic state. In some embodiments, resin 204 can be made from the same material as the dynamic material. As shown in FIG. 2, the composition 200 also includes a heat generating material 206 that can be configured to absorb an amount of energy and to convert at least some of the amount of energy to heat (to thereby alter the state of the dynamic material). As depicted in FIG. 2, in some embodiments, the resin can be mixed with the dynamic material to form the mixture that holds the heat generating material 206. In some embodiments, the resin and the dynamic material properties are provided by two different molecules, but the molecules are covalently linked together. In some embodiments, the resin and dynamic material are a single molecule, that is, the dynamic material can serve as a resin and support the heat generating material 206. In some embodiments, the resin molecule is separate from the dynamic material molecule. A resin need not be present in all embodiments described herein, and thus, can be optional. A heat generating material need not be present in all embodiments described herein, and thus, can be optional.

Figure 3:
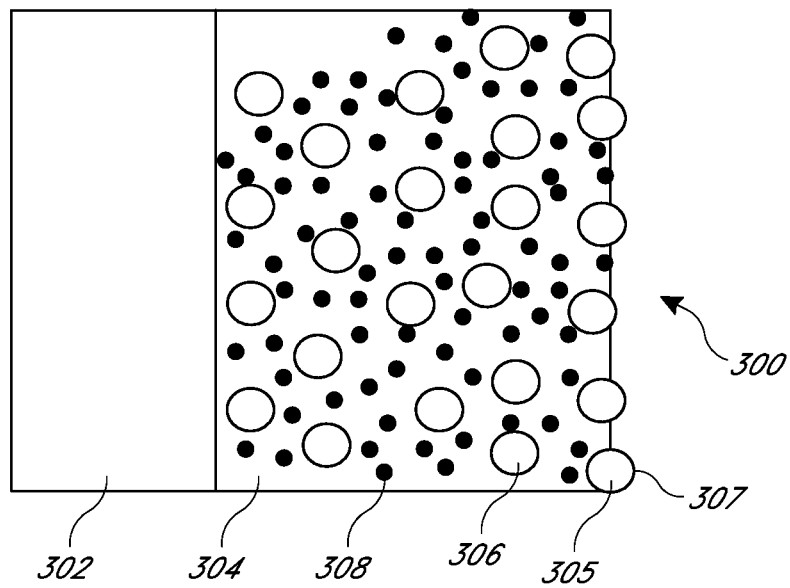
FIG. 3 is a drawing depicting a composition for coating a surface according to some embodiments.

FIG. 3 depicts some embodiments of a composition 300 for coating a surface 302 (such as a base material). The composition 300 includes a resin 304. The composition also includes a dynamic material 306 configured to be reversibly convertible between a hydrophobic state and a hydrophilic state and a heat generating material 308 configured to absorb an amount of energy and to convert at least some of the amount of energy to heat. The dynamic material 306 and the heat generating materials can be different materials from the resin 304. As depicted in FIG. 3, in some embodiments, the dynamic material 306 can include a bead or other substrate 305 with a layer 307 on the substrate. In such embodiments, the properties of the dynamic material can be provided by the layer 307 on the bead or other substrate 305. Thus, for example, where the dynamic material is a thermosensitive block copolymer, the copolymer can be applied as a layer on the bead 305 to provide the dynamic material 306. Thus, one can control the localization of the dynamic material by controlling the localization of the bead or other substrate 305.

Figure 4:
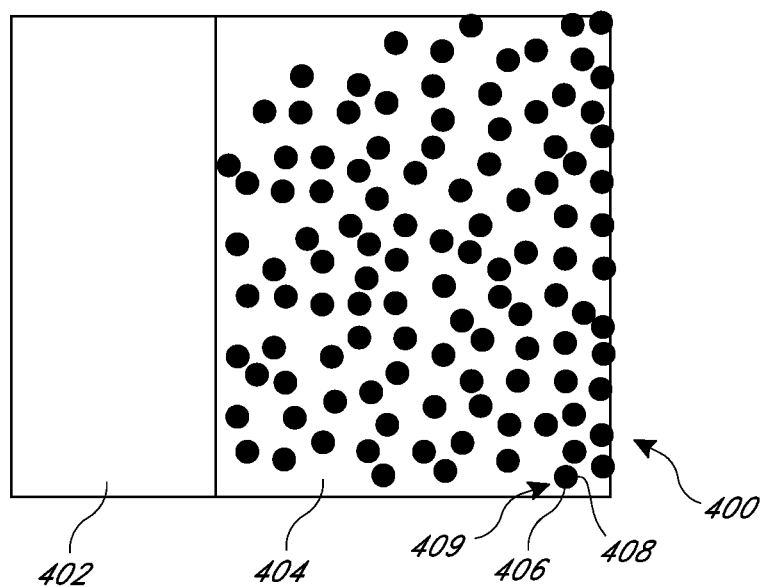
FIG. 4 is a drawing depicting a composition for coating a surface according to some embodiments.

FIG. 4 depicts some embodiments of a composition 400 for coating a surface 402 (such as a base material). The composition 400 includes a base resin 404. The composition also includes a dynamic material coating 406 that coats a heat generating material 408 configured to absorb an amount of energy and to convert at least some of the amount of energy to heat. The dynamic material 406 can be mixed with the heat generating material 408 to provide a coated heat generating material. The coated heat generating material can then be applied and/or mixed with a resin. In some embodiments, the resin can be applied to a surface first, and before the resin sets, the dynamic material coated heat generating material 409 can be applied to the resin. This can bias the distribution of the dynamic material coated heat generating material 409 towards the surface of the resin, so that less dynamic material coated heat generating material can be used.

In some embodiments, the coating can be any thickness desired. In some embodiments the coating can have a thickness of about 1 μm-10 mm. In some embodiments, the coating can have a thickness of about 10 μm-1 mm. In some embodiments the coating can have a thickness of about 200 μm-800 μm. In some embodiments, the coating can have a thickness of about 500 μm. In some embodiments, the thickness can be 100 mm or less, for example 100, 10, 1, 0.1, 0.01, or 0.001 microns, including any range beneath any one of the preceding values and any range between any two of the preceding values. Embodiments in which the dynamic and/or heat generating material are a same material, the resin can have a lower thickness than embodiments in which the dynamic and/or heat generating material are different materials from the resin. Embodiments in which only a dynamic material is applied can also be relatively thin.

Figure 5:
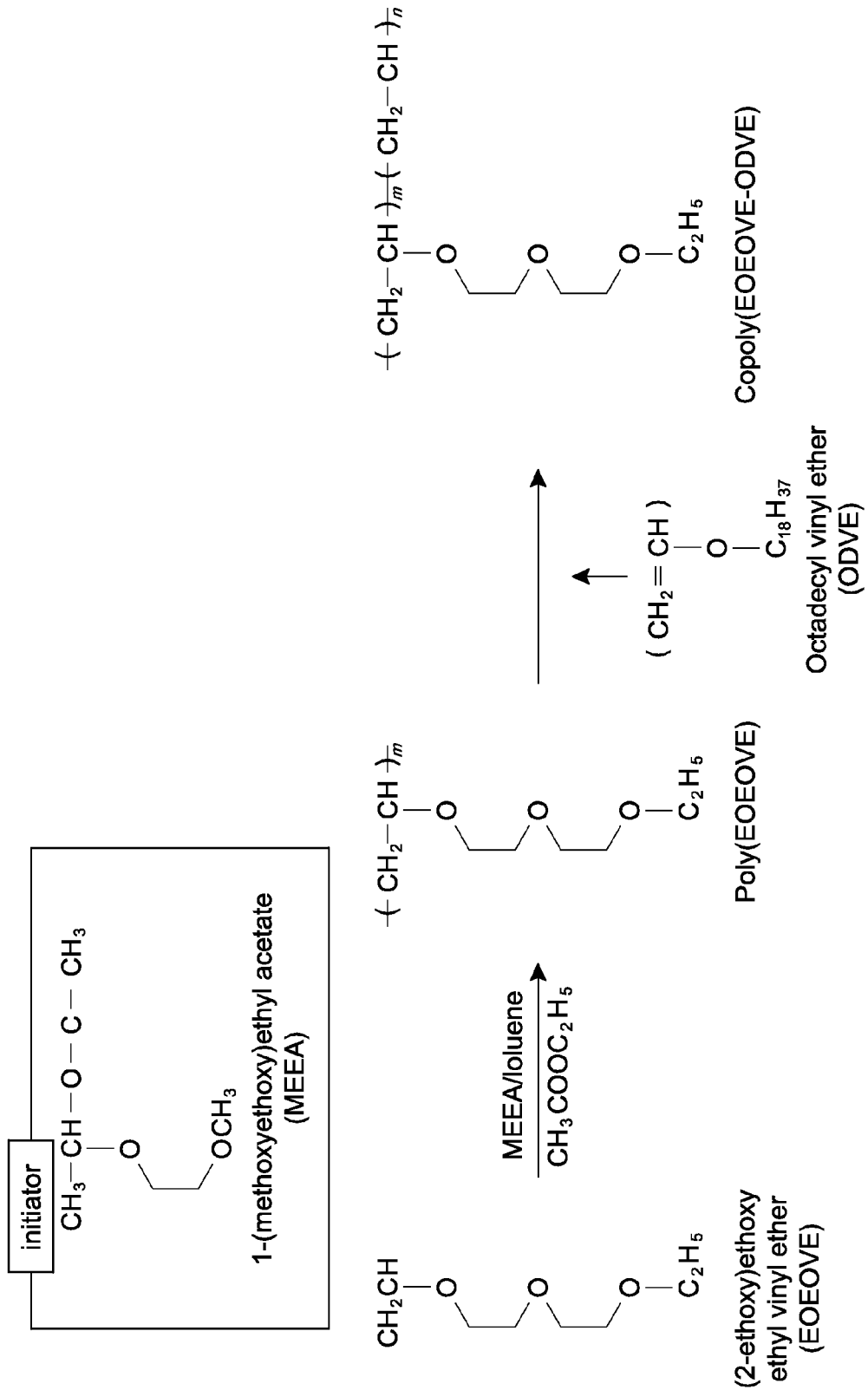
FIG. 5 is a drawing depicting a reaction scheme for the formation of some embodiments of a dynamic material.

In some embodiments, any material that can transition between a hydrophobic to a hydrophilic state (or vice versa); in response to an environmental stimulus can be used as a dynamic material. In some embodiments, the dynamic material includes at least one of a thermosensitive block copolymer, a thermosensitive polymer, or a thermosensitive star polymer. Thermosensitive block polymers can include at least one of (2-ethoxy)ethoxyethyl vinyl ether (EOEOVE), N-isopropylacrylamide (NIPAAm) monomer, or a vinyl monomer including a tertiary amino group or an acid group. Such materials can have improved durability, water resistance, and weather resistance. In some embodiments, the thermosensitive block copolymer EOEOVE, for example, can change between hydrophilic and hydrophobic states in response to application of heat. EOEOVE can change from hydrophilic to hydrophobic at around 35° C.-40° C. Thermosensitive block copolymers can include at least one of (2-ethoxy)ethoxyethyl vinyl ether (EOEOVE) or octadecyl vinyl ether (ODVE). In some embodiments, EOEOVE and ODVE can be synthesized by living cationic polymerization. The EOEOVE can act as a temperature-sensitive moiety and the ODVE can act as an anchor unit. In some embodiments, the thermosensitive block copolymer is hydrophilic under the phase transition temperature (Tp), and under such a temperature, any water applied will spread out over the surface and assist in cleaning. In the presence of heat, the thermosensitive block copolymers change their status from hydrophilic to hydrophobic, resulting in any water present being beaded up. While any molecule that transitions in response to an environmental stimulus could be used as a dynamic material, FIG. 5 depicts an example of a chemical synthesis for the production of poly(2-ethoxy)ethoxy ethyl vinyl ether-block-octadecyl vinyl ether. In some embodiments, CHVE and/or EOEOVE type block copolymers can be used as dynamic materials. In some embodiments, the material can include, for example, quarternized diblock copolymers, a PDEA, or a magnetic polymer such as PAN-iCNQ. In some embodiments, the dynamic material can include a copolymer of a vinyl monomer having a tertiary amino group and/or an acid group and EOEOVE. In some embodiments, the dynamic material can include a functional group selected from a salt of a tertiary amino group and a salt of an acid group. In some embodiments, the dynamic material can be a star polymer of EOEOVE (such as a star poly(EOEOVE). In some embodiments, the dynamic material can include at least one of PIPAAm(Poly(N-isopropylacrylamide)), including copolymers thereof, such as poly(N-isopropylacrylamide-co-N,N-dimethylacrylamide)-b-poly(d,l-lactide-co-glycolide), a polymer of thermosensitive peptides, including, for example, poly-L-EGxGlu homopolypeptides or depsipeptides, or a copolymer of these, such as Boc-(Gly-Ile-Gly-Hmb-Pro)n-PEG4000. In some embodiments, the dynamic material can include a stimulus-responsive peptide, such as those listed in Table 1 below.

TABLE 1

| STIMULUS | MOTIF/PEPTIDE SEQUENCE | CONFORMATIONAL CHANGE |
|---|---|---|
| Temperature, pH | ADADADADARARARAR (SEQ ID NO: 1) | β-Sheet ↔ α-helix |
| Temperature, salt | SIRELEARIRELELRIG (SEQ ID NO: 2) | α-helix ↔ β-Sheet |
| Temperature | YGCVAALETKIAALE TKKAALETKIAALC (SEQ ID NO: 3) | |
| Zinc | DAEFRHDSGYEVHHQK (SEQ ID NO: 4) | Poorly folded helix ↔ Well folder irregular $3_{10}$helix |
| Calcium | GGXGXDX(L/F/I)X (SEQ ID NO: 5) | Disordered ↔ β-roll |
| Porphyrin | IQQLKNQIKQLLKQ (SEQ ID NO: 6) | Disordered ↔ α-helix |
| pH | CCCCGGGSRGD (SEQ ID NO: 7) | ND |
| Temperature, pH, salt | VPGXG (SEQ ID NO: 8) | Disordered ↔ β-turn |

TABLE 1-continued

| STIMULUS | MOTIF/PEPTIDE SEQUENCE | CONFORMATIONAL CHANGE |
|---|---|---|
| Trifluorinated alcohols, salt | GIGAVLKVLTTGL PALISWIKRKRQQ (SEQ ID NO: 9) | Disordered ↔ α-helix |
| pH | 1. EAALEAALELAAELAA (SEQ ID NO: 10) 2. KAALKAALKLAAKLAA (SEQ ID NO: 11) 3. KAALEAALKLAAELAA SEQ ID NO: 12) 4. EAALKAALELAAKLAA (SEQ ID NO: 13) | β-Sheet ↔ α-helix |
| Redox state | CGGEIRALKYEIARLKQAA QAKIRALEQKIAALEGGC (SEQ ID NO: 14) | Dimeric coiled coil ↔ monomeric α-helix |
| Zinc | YIHALHRKAFAKIAR (SEQ ID NO: 15) LERHIRALEHAA (SEQ ID NO: 16) | Trimeric coiled coil ↔ monomeric α-helix |
| Redox state | YLKAMLEAMAKLMAKLMA (SEQ ID NO: 17) | α-helix ↔ β-sheet |
| Light | EACARV$_4$AACEAARQ$^a$ (SEQ ID NO: 18) | Disordered ↔ α-helix |
| pH | RVIEKTNEKFHQIEKEFSE VEGRIQDLEKYVEDTKI (SEQ ID NO: 19) | |
| Solvent Polarity | ELALKAKAELELKAG (SEQ ID NO: 20) | β-Sheet ↔ α-helix |
| | ELLAKKALEAEALKG (SEQ ID NO: 21) | Disordered ↔ α-helix |
| | 1. EWAVVLVAEAKHQ (SEQ ID NO: 22) | Disordered ↔ α-helix |
| | 2. WGKIQKLKIAKVFK (SEQ ID NO: 23) | Disordered ↔ β-sheet |
| | 3. KVIKCKAAVLWEEKK (SEQ ID NO: 24) | |
| | 1. IIPTAQETWLGVLTIMEHTV (SEQ ID NO: 25) | Disordered ↔ α-helix |
| | 2. LSGGIDVVAHELTHAVTDY (SEQ ID NO: 26) | Disordered ↔ β-sheet |
| | 3. PAVHASLDKFLSSVSTVL (SEQ ID NO: 27) | |
| | 4. GYQCGTITAKNVTAN (SEQ ID NO: 28) | |
| | 5. VAEAKVAEAKVAEAK (SEQ ID NO: 29) | |
| pH | ETATKAELLAKYEATHK (SEQ ID NO: 30) | α-helix ↔ β-sheet |
| pH, salt, light | ETATKAELLAKZEATHK$^b$ (SEQ ID NO: 31) | |
| pH, temperature | IGKLKEEIDKLNR(D/N)LDDM (E/Q)DENEQLKQENKTLL (SEQ ID NO: 32) KVVGKLTR (SEQ ID NO: 33) | Disordered ↔ α-helix |
| | 1. EIAQLEYEISQLEQ (SEQ ID NO: 34) | |
| pH | 2. KIAQLKYKISQLKQ (SEQ ID NO: 35) | |
| | 3. EIAQLEYEISQLEQEIQALES (SEQ ID NO: 36) | |
| | 4. KIQALKQKISQLKWKIQSLKQ (SEQ ID NO: 37) | |
| Temperature, pH, salt | VPGXG (SEQ ID NO: 8) | Disordered ↔ β-turn |
| Temperature | VPGXG (SEQ ID NO: 8) | |

TABLE 1-continued

| STIMULUS | MOTIF/PEPTIDE SEQUENCE | CONFORMATIONAL CHANGE |
|---|---|---|
| pH | QATNRNTDGSTDYGILQINSR (SEQ ID NO: 38) | ND |
| Shear | KLEALYVLGFFGFFTLGIMLSYIR (SEQ ID NO: 39) | ND |
| Hydrogen bond donor | KLEALYVLGFFGFFTLGIMLSYIR (SEQ ID NO: 40) | β-Sheet ↔ helix/random coil |
| Strength of solvent | 1. FKFEFKFEFKFE (SEQ ID NO: 41) | ND |
| Salt | 2. FKFQFKFQFKFQ (SEQ ID NO: 42) | Disordered ↔ β-hairpin |
| Temperature | VKVKVKTKVPPTKVKTKVKV (SEQ ID NO: 43) | ND |
| Salt | FEFEFKFKFEFEFKFK (SEQ ID NO: 44) | |
| pH | VKVKVKVKVPPTKVKVKVKV (SEQ ID NO: 45) | Disordered ↔ β-hairpin |
| | EIAQHEKEIQAIEKKIAQHEY KIQAIEEKIAQHKEKIQAIK (SEQ ID NO: 46) | Disordered ↔ α-helix |
| Salt | QQKFQFQFEQQ (SEQ ID NO: 47) | Disordered ↔ β-sheet |
| Temperature | VPGXG (SEQ ID NO: 8) | Disordered ↔ β-turn |
| pH | QQRFEWEFEQQ (SEQ ID NO: 48) | Disordered ↔ β-sheet |
| Salt | CKQLEDKIEELLSKA (SEQ ID NO: 49) ACKQLEDKIEELSK (SEQ ID NO: 50) | Disordered ↔ α-helix |
| Solvent polarity | FF (SEQ ID NO: 51) | ND |
| | GNDYEDRYYREN (SEQ ID NO: 52) MYRYPNQVYYRPVC (SEQ ID NO: 53) | β-Hairpin ↔ α-helix |
| Copper | (PHPGGSNWGQ)$_3$G (SEQ ID NO: 54) | ND |
| Ni$^{2+}$, Co$^{2+}$, Ru(II) | bpGELAQKLEQALQKLA$^c$ (SEQ ID NO: 55) | Poorly folded monomeric α-helix ↔ well folded trimeric α-helix |
| Temperature, pH, salt | VPGXG (SEQ ID NO: 8) | Disordered ↔ β-turn |
| Salt | 1. AEAEAKAKAEAEAKAK (SEQ ID NO: 56) 2. RARADADARARADADA (SEQ ID NO: 57) | β-Sheet ↔ ND |
| Salt, pH | KLDLKLDLKLDL (SEQ ID NO: 58) 1. RADARADARADARADA (SEQ ID NO: 59) 2. RARADADARARADADA (SEQ ID NO: 60) | |

$^c$"bp" refers to a 2,20-bipyridine;
$^a$"A" refers to a-aminoisobutyric acid;
$^b$Z refers to p-phenylazo-L-phenylalanine;

In some embodiments, any of the stimuli noted in Table 1 can be employed as the "energy" for the methods provided herein. In some embodiments, any of the molecules noted in Table 1 can be employed for, or as part of, the dynamic material described herein. In some embodiments, the peptide can be a photoswitchable peptide (and can include aspects such as a light-sensitive LOV2 domain of Avena Sativa phototropin 1 (AsLOV2) and/or rhodopsin-like constructs).

Figure 6:
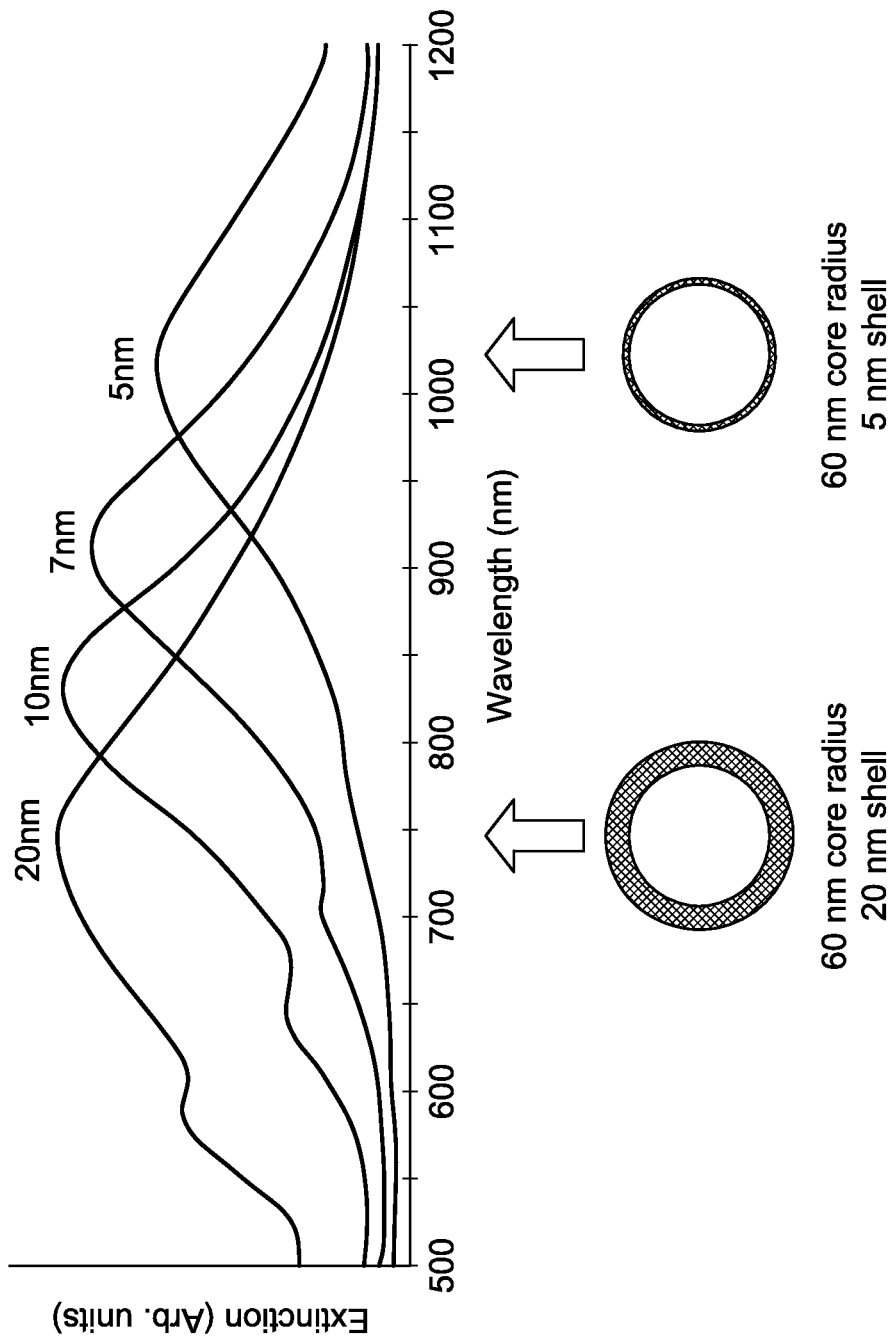
FIG. 6 is a drawing depicting absorbance characteristics for different kinds of gold nanoparticles.
Figure 7:
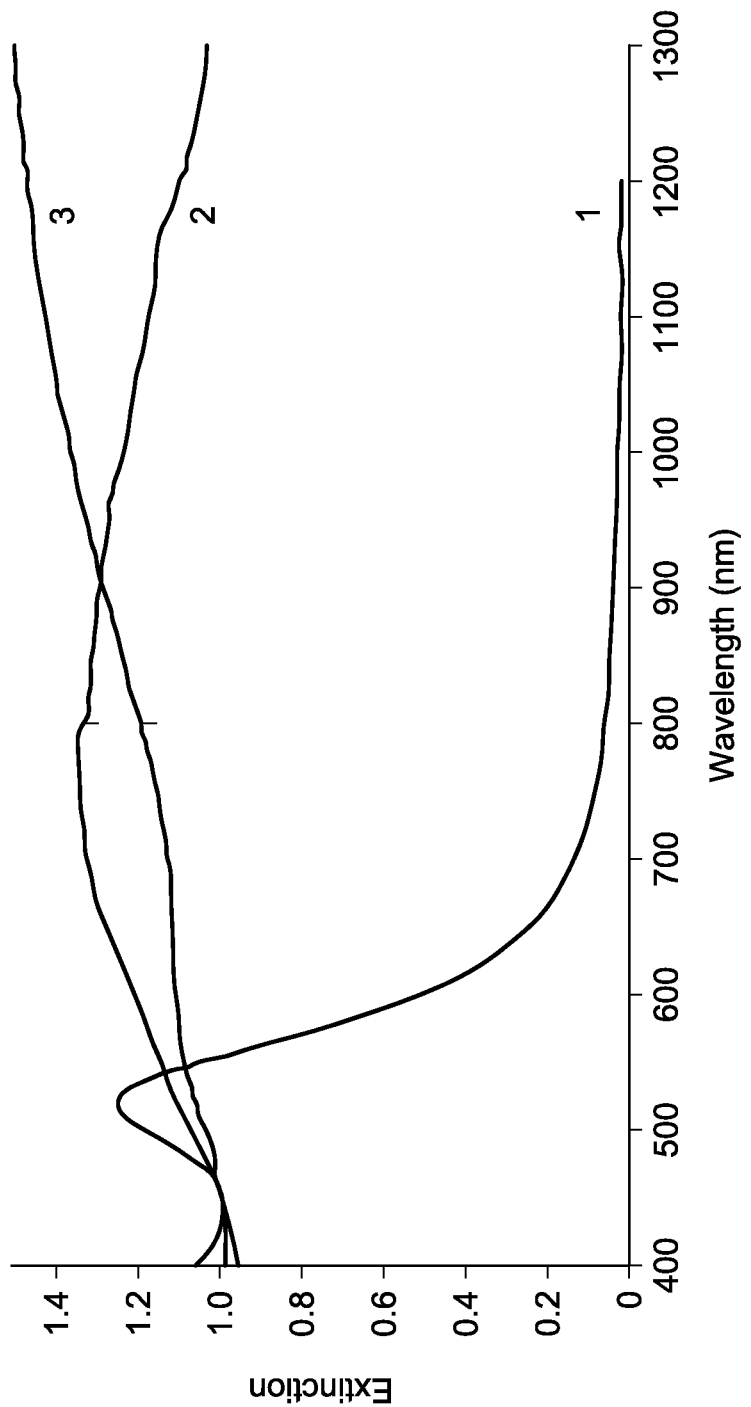
FIG. 7 is a drawing depicting absorbance characteristics of gold core shell type nanoparticles.

Any material that can convert energy into heat can be employed as a heat generating material. In some embodiments, the heat generating material includes at least one nanoparticle. The nanoparticles can be configured to absorb at least one of infrared energy, microwave energy, or ultrasonic energy. The at least one nanoparticle can include at least one of a core-shell type nanoparticle, an aggregated nanoparticle, a multi-layered nanoparticle, a magnetic nanoparticle, or a hollow nanoparticle. Aggregated nanoparticles and multi-layered nanoparticles can have wide absorbance bands, allowing them to absorb a high amount of energy. FIG. 6 depicts absorbance characteristics for 1) gold nanoparticles, 2) gold core-shell type nanoparticles, and 3) gold multi-layered particles. A skilled artisan will recognize that selection of particular nanoparticles can be used to select absorbance characteristics. In some embodiments, the nanoparticle includes at least one of an AU core-shell type nanoparticle, a $Fe_3O_4$ nanoparticle, a $CoFe_2$ nanoparticle, a Ni—Cu nanoparticle, a Fe—Pt nanoparticle, a Pd—Co nanoparticle, a PLGA microbubbles, or a PVA microbubbles (optionally with a chemical crosslinker), PLA-PFO microbubbles. In some embodiments, a nanoparticle can be chosen for particular absorbance characteristics. FIG. 7 depicts infrared absorbance characteristics of AU core shell type nanoparticles of different sizes and thicknesses. A skilled artisan will recognize that a desired absorbance can be selected based on modification of the size and/or thickness of the nanoparticle. In some embodiments, the heat generating material can include magnetic nanoparticles. In some embodiments, materials can be used for the heat generating materials that have a low curie temperature (for example around 40 degrees Centigrade). Such materials can be self regulating (for example, they lose their magnetic moment at temperatures above 40 degrees Centigrade and can reduce the chance of excessive heating. In some embodiments, carbon nanotubes can be employed for microwave absorbance. In some embodiments, hollow microcapsules can be used as the heat generating material, for example in combination with the application of ultrasound.

As noted throughout, a variety of environmental factors or stimuli can be used herein. In some embodiments, it can be changes in radiation levels, such as UV, infrared, visible, or solar radiation. In some embodiments, it can be changes in ultrasound levels. In some embodiments, it can be changes in microwave levels. In some embodiments, the amount of the environmental change applied is such that an adequate and/or desired level of change in hydrophobicity occurs, without resulting in too much heat generation, which might damage the product and/or layer. In some embodiments, heat itself can be directly applied. In some embodiments, the effectiveness of the environmental change can be due, in part, to the amount of heat generating material present and/or how it is located relative to the other components. Thus, using more of the heat generating material (or more efficient heat generating material, or more efficient placement of heat generating material) can provide for embodiments that require less environmental changes to produce the change in hydrophobicity.

In some embodiments, a coating is provided. The coating can include a base material and a dynamic material. The dynamic material can be distributed over the base material and can be configured to be reversibly convertible between a hydrophobic state and a hydrophilic state. The transition between the hydrophilic state and the hydrophobic state can occur in a heat (or other environmental factor) dependent manner. The coating can further include a heat generating material distributed over the base material. The heat generating material can be configured to absorb an amount of energy and to convert at least some of the energy to heat. As described herein, in some embodiments, the dynamic material can be mixed with the heat generating material. In some embodiments, the dynamic material can be separate from the heat generating material.

In some embodiments, a composition for coating a surface is provided. The composition can include at least one dynamic material configured to be reversibly convertible between a hydrophobic state and a hydrophilic state. The transition between the hydrophilic state to the hydrophobic state can occur in an environment dependent manner. The environment dependent manner can include a change a change in pH, a change in temperature, a change in magnetic field, or a change in electrical potential. The at least one dynamic material can include, for example, quarternized diblock copolymers, a PDEA, or a magnetic polymer such as PANiCNQ.

In some embodiments, the dynamic material is associated with a resin. The resin can include at least one of polyurethane resin; acrylic resin, acrylic urethane resin, acrylic acid-styrene copolymer, styrene resin, polyester resin, epoxy resin, fluorocarbon resin, ethylene-vinyl acetate copolymer, acrylic acid-vinyl acetate copolymer, vinyl acetate resin, vinyl ether resin, or a polymer containing vinyl group.

Figure 8:
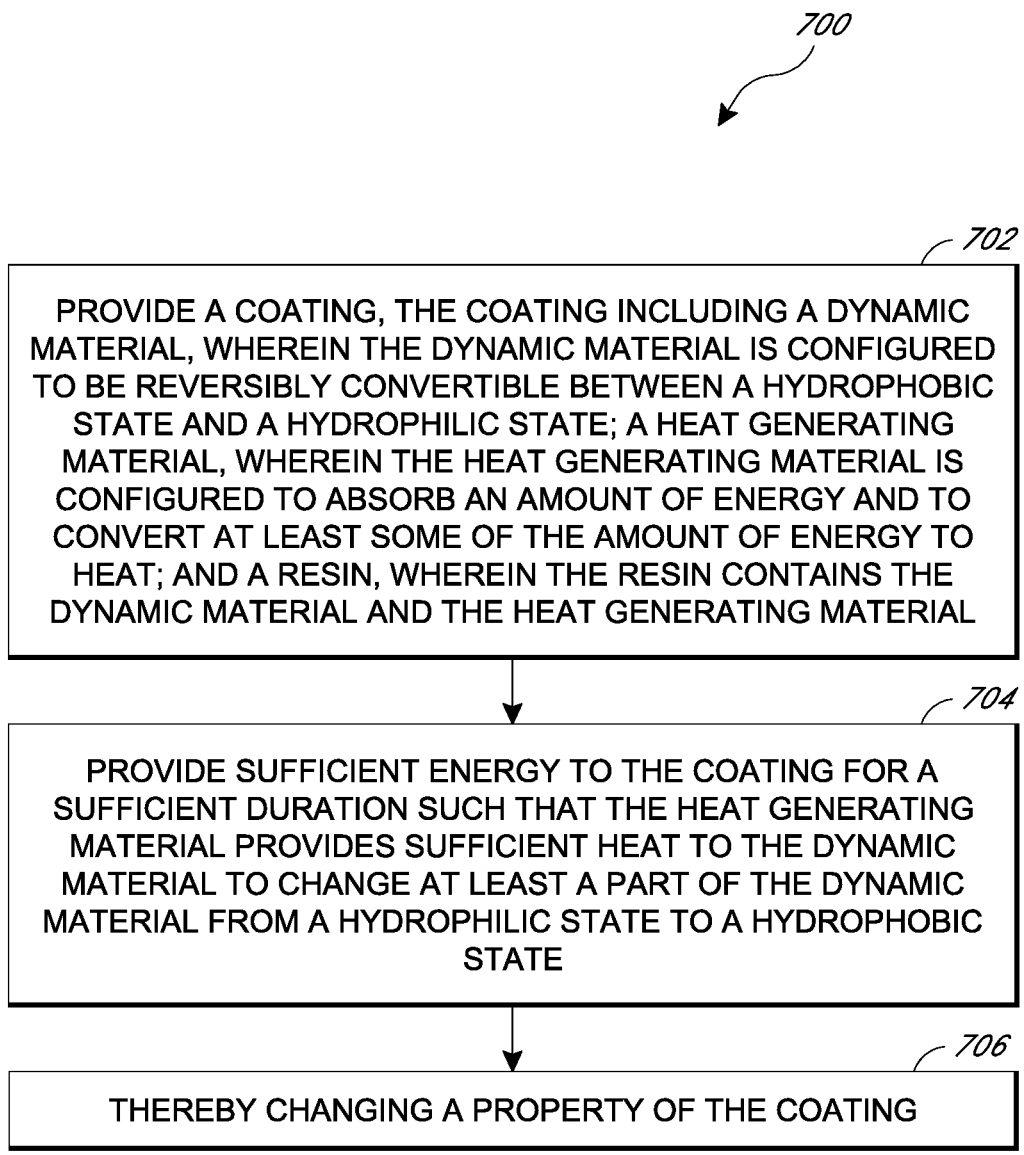
FIG. 8 is a flow chart depicting some embodiments of a method of changing a property of a coating.

FIG. 8 depicts some embodiments of a method 700 of changing a property of a coating. The method includes, at block 702 providing a coating including a dynamic material, a heat generating material, and a resin containing the dynamic material and the heat generating material. The dynamic material can be configured to be reversibly convertible between a hydrophobic state and a hydrophilic state. The heat generating material can be configured to absorb an amount of energy and to convert at least some of the amount of energy to heat. The method 700 can also include, as depicted at block 704, providing sufficient energy to the coating for a sufficient duration such that the heat generating material provides sufficient heat to the dynamic material to change at least a part of the dynamic material from a hydrophilic state to a hydrophobic state, thereby changing a property of the coating, as depicted at block 706. In some embodiments, the energy can be applied by a device, such as an IR light or a resistive heater. In some embodiments, the energy can be applied by nature, such as through sunlight.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, the method outlined in FIG. 8 can also include discontinuing the provision of the amount of energy required to keep the dynamic material in one state, and thereby allowing the dynamic material to return to the hydrophilic state upon cooling of the dynamic material. Thus, in some embodiments, the material can be cycled between states as desired.

In some embodiments, the methods and/or devices and/or coatings provided herein can be used for any situation in which one wishes to selectively change between hydrophobic and hydrophilic properties for a surface. In some embodiments, this can be used for washing items and/or removing and/or distributing water. The water can come from any source, such as rain, mist, snow, frost, applied for cleaning, etc. In some embodiments, the process can be reversed to remove and/or manipulate a hydrophobic material on the surface, such as oil on a windshield. In some embodiments, a membrane or pad with the coating can work as a reversible water/oil separator or oil absorb/release device in temperature dependent manner. In some embodiments, these aspects can be employed to provide a coating that is switchable between and antifogging coating (when it is hydrophilic) and a water repelling coating (when the coating is hydrophobic). Such an arrangement can be especially useful for coatings on automobile windows and mirrors, which can already have a heat source in proximity thereto. In some embodiments, this can be useful in marine applications or other applications near water, for example, an interior coating on goggles and/or masks for swimming, windows for saunas and/or steam rooms, etc. In some embodiments, these aspects can be employed as an anti-frosting or snow guard (which can optionally be manipulated by the change in temperature).

Figure 9:
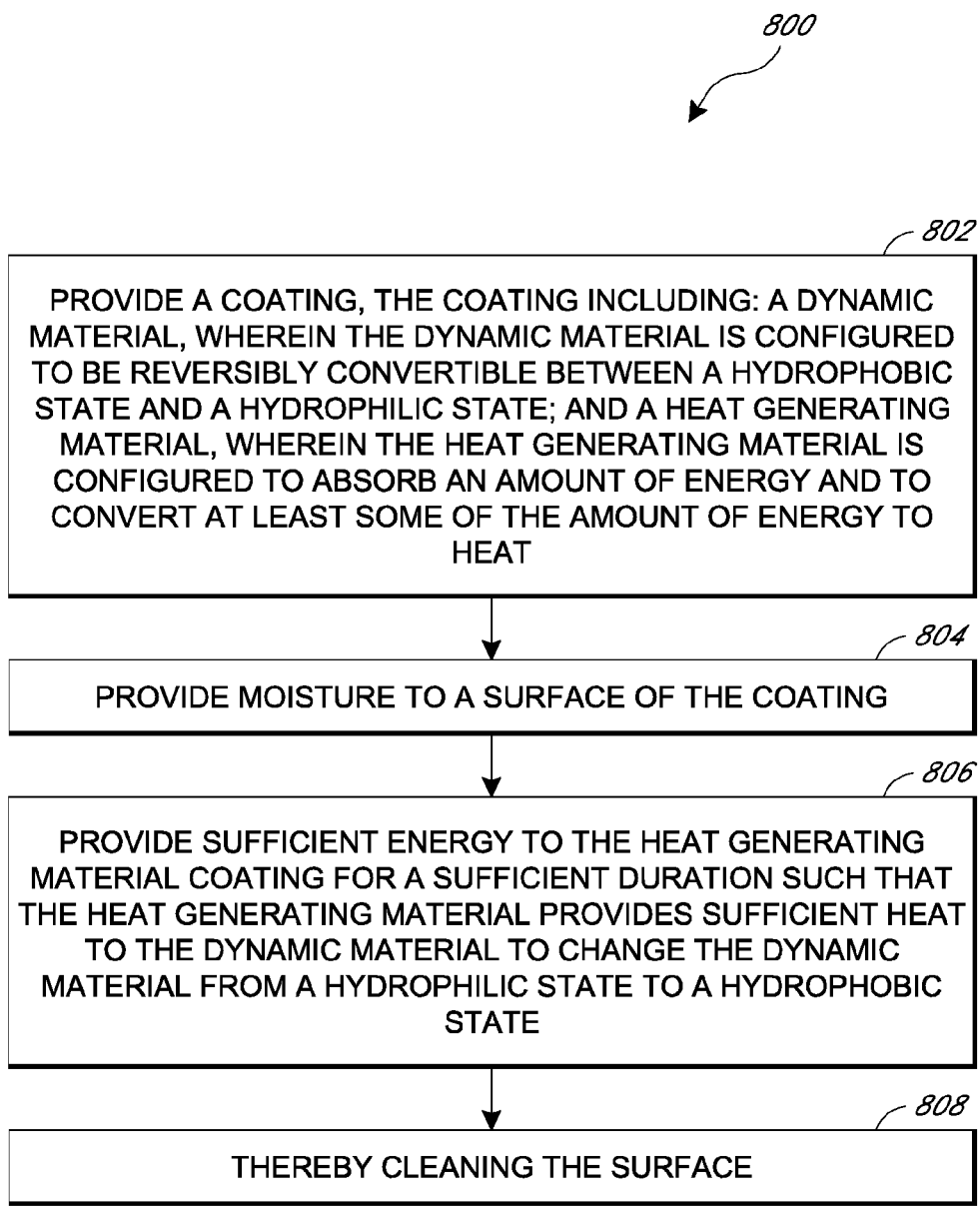
FIG. 9 is a flow chart depicting some embodiments of a method of cleaning a surface.

FIG. 9 depicts some embodiments of a method 800 of cleaning a surface. The method includes, at block 802 providing a coating. The coating includes a dynamic material configured to be reversibly convertible between a hydrophobic state and a hydrophilic state and a heat generating material configured to absorb an amount of energy and to convert at least some of the amount of energy to heat. At block 804, the method 800 includes providing moisture to a surface of the coating. At block 806, the method 800 includes providing sufficient energy to the heat generating material coating for a sufficient duration such that the heat generating material provides sufficient heat to the dynamic material to change the dynamic material from a hydrophilic state to a hydrophobic state, thereby cleaning the surface as depicted at block 808.

In some embodiments, the moisture can spread across the surface when the dynamic material is in the hydrophilic state and bead up on the surface when the dynamic material is in the hydrophobic state. Thus, the positioning and coverage of water over the surface can be controlled by switching the hydrophobic/hydrophilic properties of the surface.

In some embodiments, the method can include applying energy to different portions of the surface in order to redistribute water away from a portion of the surface receiving energy sufficient to change the dynamic material from the hydrophilic state to the hydrophobic state. Thus, in some embodiments, different portions of the surface can be cleaned in this manner without the whole of the surface being wet. The surface can be washed when the dynamic material is in the hydrophilic state and dried when the dynamic material is in the hydrophobic state. Thus, any one or more of the above aspects can be employed to more readily clean a surface. The technology can be applied to any surface that can be washed. In some embodiments, the surface can include at least one of a surface of a house, a surface of a building, or a surface of a window. In some embodiments, surfaces that are inconvenient to clean can benefit from this type of coating. Furthermore, in some embodiments, surfaces where one side is hard to get to, but the opposite side is easy (for example, a window in a skyscraper) can especially benefit from some of the embodiments provided herein, as heat or other environmental conditions can be manipulated from the inside of the building, while the outside of the building experiences the change in surface properties.

In some embodiments, the energy provided to the heat generating material includes ambient infrared energy. In some embodiments, the energy provided to the heat generating material includes energy provided from one side of the surface to a coating positioned on an opposite side of the surface, for example energy applied from an inside of a building. In some embodiments, the method further includes allowing the dynamic material to return to the hydrophilic state by halting provision of sufficient energy. In some embodiments, the process of providing sufficient energy and the process of halting the provision of sufficient energy can be performed by ambient infrared energy that is present during a twenty-four hour period of time (for example, sunlight). Thus, in some embodiments, the method occurs simply by the rising and setting of the sun.

Figure 10:
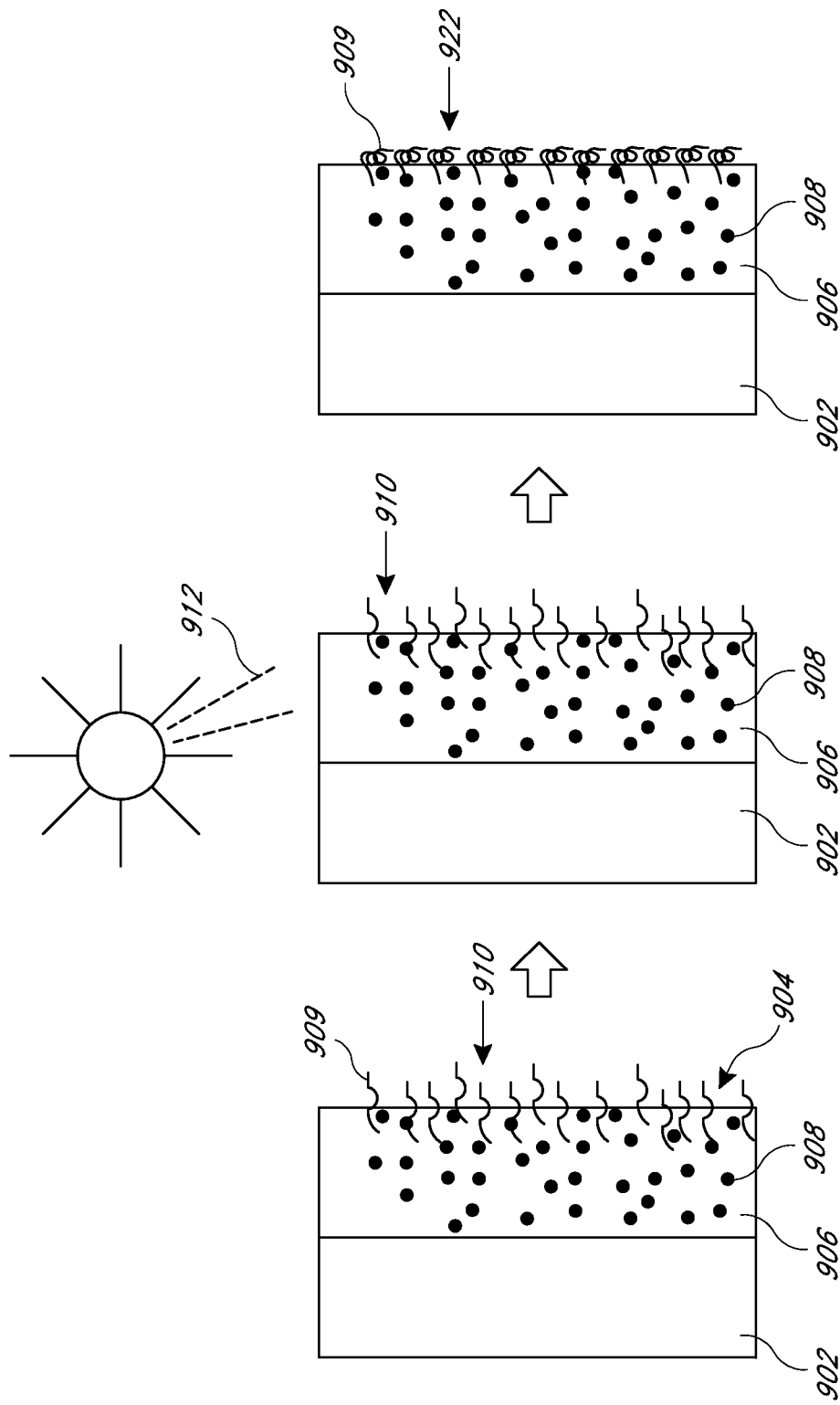
FIG. 10 is a drawing of a method of cleaning a surface according to some embodiments.

FIG. 10 depicts some embodiments of a method of transitioning a surface from a hydrophilic state to a hydrophobic state. A surface 902 can include a coating 904 as described herein. In the depicted embodiment, the composition includes a dynamic material 909 and a heat generating material 908, which can be associated via a resin 906. The dynamic material 909 can be configured to be reversibly convertible between a hydrophobic state (right side) and a hydrophilic state (left side). In some embodiments, transition between the hydrophilic state to the hydrophobic state occurs in an IR dependent manner. The heat generating material 908 can be configured to absorb an amount of energy and to convert at least some of the energy to heat. In the depicted embodiment, the dynamic material can provide a hydrophilic surface 910 without the application of an adequate level of infrared energy, for example, at night. In such an arrangement, moisture that is present on the surface forms a film and washes away any dirt or pollution on the surface. During the day, ambient infrared energy 912 is absorbed by the heat generating material 908, heating the dynamic material 909 to change the hydrophobicity of the surface to a hydrophobic surface 922. When the surface becomes more hydrophobic, any water will tend to bead up more and either roll off of the surface, shake off, blow away, or can be wiped away more easily than when the surface is a hydrophilic surface. Then, when the sun sets again, there will once again be less ambient infrared energy present and the dynamic material 909 cools and returns the surface to a hydrophilic surface 910.

The methods described herein can be performed using any combination of the materials and energy sources described herein.

Figure 11:
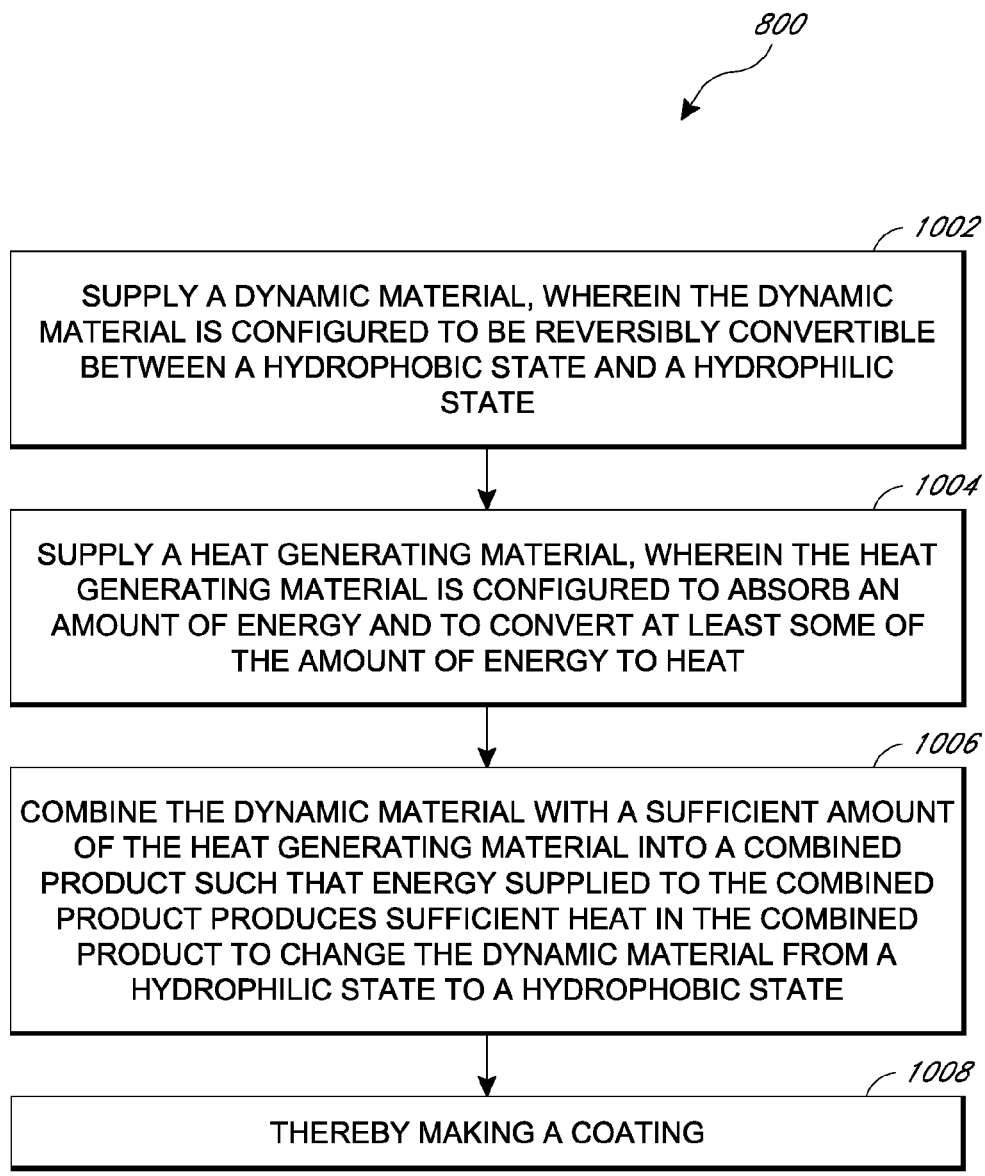
FIG. 11 is a flow chart depicting some embodiments of a method of making a coating.

FIG. 11 depicts some embodiments of a method 800 of making a coating. The method includes, at block 1002, supplying a dynamic material wherein the dynamic material is configured to be reversibly convertible between a hydrophobic state and a hydrophilic state. At block 1004, the method 1000 includes supplying a heat generating material, wherein the heat generating material is configured to absorb an amount of energy and to convert at least some of the amount of energy to heat. The method includes, at block 1006, combining the dynamic material with a sufficient amount of the heat generating material into a combined product such that energy supplied to the combined product produces sufficient heat in the combined product to change the dynamic material from a hydrophilic state to a hydrophobic state, thereby making a coating as depicted in block 1008. In some embodiments, phase separation can be used to make the coating. In some embodiments, the surface energy of the resin (base material) is higher than the dynamic material. Soon after the application of the coating material, the coating itself can be heated. The dynamic material will become hydrophobic (low surface energy), and phase separation will occur. The dynamic material will then come together on the surface of the coating.

In some embodiments, a kit is provided. The kit includes a dynamic material configured to be reversibly convertible between a hydrophobic state and a hydrophilic state. The transition between the hydrophilic state to the hydrophobic state can occurs in a heat dependent manner (or any other environment dependent manner as outlined herein). The kit also includes a heat generating material. The heat generating material is configured to absorb an amount of energy (for example, IR, ultrasound, etc.) and at least some of the amount of energy to heat. In some embodiments, the kit also includes an energy source (such as an IR source, a microwave source, an ultrasound source, or even a heat source). In some embodiments, the kit includes a dynamic material configured to be reversibly convertible between a hydrophobic state and a hydrophilic state. The transition between the hydrophilic state to the hydrophobic state occurs in an environment dependent manner Such a kit further includes an environment altering material configured to alter the hydrophobic or hydrophilic state of the dynamic material. Such a kit also includes an energy source.

In some embodiments, additional tools can be employed with any of the above devices, kits, methods, etc. For example, in some embodiments, a robot or remotely controlled device can be provided that includes the energy source (for example, an IR source, a heat source, an ultrasound source, and/or a microwave source). The robot can be configured to and/or capable of scanning the energy source along a surface to be cleaned. Thus, in some embodiments, cleaning can be performed by a robot or device that applies the energy source to the surface. In some embodiments, the robot can be configured to move up and down windows or an external surface of a building. In some embodiments, such as when microwaves are used, a user can apply the environmental change from a distance, for example the ground towards an upper floor window) and thus need not put the energy source in proximity to the surface.

In some embodiments, the coating can be clear. In some embodiments, the coating can be opaque. In some embodiments, the coating can be colored and/or tinted. In some embodiments, the coating can obscure or completely hide a surface beneath the coating. In some embodiments, the coating can be a dark and/or light absorbent color, so as to provide additional effectiveness in turning visible light into heat. The coating can be applied in a variety of manners. In some embodiments, the coating can be sprayed onto a surface. In some embodiments, the coating can be painted and/or rolled onto a surface. In some embodiments, the coating can be on a film, and the film applied to a surface.

In some embodiments, the heat generating material need not be included in the composition. Instead, a heater can be applied directly to the dynamic material. In some embodiments, the addition of heat is via an external source, such as a heat gun. In some embodiments, the heat can be applied via a heater or heating element that is located close to the coating that contains the dynamic material. For example, in some embodiments, the coating can be over a resistive heater (such as a filament in a window), and the window itself can be heated in this manner.

In some embodiments, the dynamic material is part of a paint or other coating. While the dynamic material can be associated with a surface by a resin, in some embodiments, the dynamic material can be applied directly to a surface without the need of a resin to keep it associated with the surface. This can be achieved in a number of ways, for example, the dynamic material can be covalently bound to the surface. In some embodiments, the dynamic material can be electrostatically associated with a charged surface In some embodiments, after electrostatic painting, the dynamic material can be bound to the surface by chemical bonding, surface energy, etc.

EXAMPLES

Example 1

Cleaning a Surface Using Ambient Infrared Energy

The present example outlines an embodiment of a method of cleaning a surface using ambient infrared energy. The method includes providing a coating to a surface of a building. The coating is 1 mm thick and includes a resin including a polyurethane resin, a gold core-shell type nanoparticles, and (2-ethoxy)ethoxyethyl vinyl ether (EOEOVE). Without heat applied to the EOEOVE, the surface of the coating is in a hydrophilic state. Accordingly, any moisture or dew present on the surface can form a film and wash any dirt or pollution away. During the day, ambient infrared energy irradiates the coating and can be absorbed by the nanoparticles, causing them to heat up. The EOEOVE changes from a hydrophilic status to a hydrophobic status in response to the heat, causing any water to bead up, thereby allowing wind and vibrations of the building to more effectively knock the water off of the surface.

Example 2

Cleaning a Surface Using Microwave Energy

The present example outlines some embodiments of a method of cleaning a surface using microwave energy. A coating of 0.5 mm is provided on a window of a house. The coating includes $Fe_3O_4$ nanoparticles and a block copolymer including (2-ethoxy)ethoxyethyl vinyl ether (EOEOVE) and octadecyl vinyl ether (ODVE). The coating also includes an acrylic resin. The coating is hydrophobic without the application of energy. Accordingly, any moisture present on the window or supplied to the window forms a film and washes away dirt and contaminants. Upon the application of microwave energy, the nanoparticles heat up and cause the block copolymer to transition to a hydrophobic state, causing the water on the window to bead up and dry more efficiently.

Example 3

Cleaning a Surface Using Ultrasonic Energy

The present example outlines some embodiments of a method of cleaning a surface using ultrasonic energy. A coating of 0.1 mm is provided on a plastic windowpane of a house. The coating includes a block copolymer including (2-ethoxy)ethoxyethyl vinyl ether (EOEOVE) and octadecyl vinyl ether (ODVE) and PLGA polymer microbubbles at a sufficient level to be effective as a heat generating material. The coating also includes an acrylic resin. The coating is hydrophobic without the application of ultrasonic energy. Accordingly, any moisture present on the window or supplied to the window forms a film and washes away dirt and contaminants Upon the application of ultrasonic energy, the microbubbles produce heat and cause the block copolymer to transition to a hydrophobic state, causing the water on the window to bead up and dry more efficiently.

Example 4

An Antifogging Water Repelling Surface

The present example outlines some embodiments of a method of a coating that can be used for antifogging and/or water repelling. A coating of 0.01 mm is provided on a piece of glass that is subject to both fogging and larger volumes of water exposure (a window in for an indoor pool). The coating a block copolymer including (2-ethoxy)ethoxyethyl vinyl ether (EOEOVE) and octadecyl vinyl ether (ODVE). The coating also includes an acrylic resin. The window includes a heat source in the form of a resistive heating element in the glass.

The coating is hydrophobic without the application of heat. Accordingly, any droplets of water on the window or supplied to the window forms a film and washes away dirt and contaminants. Upon the application of heat from the heating element, the block copolymer transition to a hydrophobic state, causing the water on the window to bead up and roll off the window more efficiently. The window is allowed to cool, thereby returning the surface to a hydrophilic state, which also provides an antifogging benefit to the window.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A composition to coat a surface, the composition comprising:
   at least one dynamic material, wherein the at least one dynamic material is configured to be reversibly convertible between a hydrophobic state and a hydrophilic state, wherein transition between the hydrophilic state and the hydrophobic state occurs in a heat dependent manner, and wherein the at least one dynamic material comprises at least one thermosensitive block copolymer that comprises (2-ethoxy)ethoxyethyl vinyl ether (EOEOVE) and octadecyl vinyl ether (ODVE); and
   at least one heat generating material, wherein the at least one heat generating material is configured to absorb an amount of energy and to convert at least some of the amount of energy to heat.

2. The composition of claim 1, further comprising at least one resin.

3. The composition of claim 2, wherein the at least one dynamic material and the at least one heat generating material are different materials from the at least one resin.

4. The composition of claim 1, wherein the at least one heat generating material comprises at least one nanoparticle.

5. The composition of claim 4, wherein the at least one heat generating material is configured to absorb at least one of infrared energy, microwave energy, or ultrasonic energy.

6. The composition of claim 4, wherein the at least one nanoparticle comprises at least one of a core-shell nanoparticle, an aggregated nanoparticle, a multi-layered nanoparticle, a magnetic nanoparticle, or a hollow nanoparticle.

7. The composition of claim 1, wherein the at least one heat generating material comprises at least one of an Au core-shell nanoparticle, a $Fe_3O_4$ nanoparticle, a $CoFe_2$ nanoparticle, a Ni—Cu nanoparticle, a Fe—Pt nanoparticle, a Pd—Co nanoparticle, a PLGA microbubble nanoparticle, or a PVA microbubble nanoparticle.

8. A composition to coat a surface, the composition comprising:
   at least one dynamic material, wherein the at least one dynamic material is configured to be reversibly convertible between a hydrophobic state and a hydrophilic state, wherein transition between the hydrophilic state and the hydrophobic state occurs in a heat dependent manner, and wherein the at least one dynamic material comprises (2-ethoxy)ethoxyethyl vinyl ether (EOEOVE) and octadecyl vinyl ether (ODVE);
   at least one heat generating material, wherein the at least one heat generating material is configured to absorb an amount of energy and to convert at least some of the amount of energy to heat, and wherein the at least one heat generating material comprises at least one of an Au core-shell nanoparticle or a PLGA microbubble nanoparticle; and
   at least one resin, wherein the at least one resin comprises at least one of a polyurethane resin or an acrylic resin.

9. The composition of claim 8, wherein the at least one heat generating material is configured to absorb at least one of infrared energy, microwave energy, or ultrasonic energy.

* * * * *

SEQUENCE LISTING

<160> NUMBER OF SEQ ID NOS: 60

<210> SEQ ID NO 1
<211> LENGTH: 16
<212> TYPE: PRT

```
<213> ORGANISM: Artificial Sequence
<220> FEATURE:
<223> OTHER INFORMATION: Synthesized Peptide

<400> SEQUENCE: 1

Ala Asp Ala Asp Ala Asp Ala Asp Ala Arg Ala Arg Ala Arg Ala Arg
1               5                   10                  15

<210> SEQ ID NO 2
<211> LENGTH: 17
<212> TYPE: PRT
<213> ORGANISM: Artificial Sequence
<220> FEATURE:
<223> OTHER INFORMATION: Peptide

<400> SEQUENCE: 2

Ser Ile Arg Glu Leu Glu Ala Arg Ile Arg Glu Leu Glu Leu Arg Ile
1               5                   10                  15

Gly

<210> SEQ ID NO 3
<211> LENGTH: 29
<212> TYPE: PRT
<213> ORGANISM: Artificial Sequence
<220> FEATURE:
<223> OTHER INFORMATION: Peptide

<400> SEQUENCE: 3

Tyr Gly Cys Val Ala Ala Leu Glu Thr Lys Ile Ala Ala Leu Glu Thr
1               5                   10                  15

Lys Lys Ala Ala Leu Glu Thr Lys Ile Ala Ala Leu Cys
            20                  25

<210> SEQ ID NO 4
<211> LENGTH: 16
<212> TYPE: PRT
<213> ORGANISM: Artificial Sequence
<220> FEATURE:
<223> OTHER INFORMATION: Peptide

<400> SEQUENCE: 4

Asp Ala Glu Phe Arg His Asp Ser Gly Tyr Glu Val His His Gln Lys
1               5                   10                  15

<210> SEQ ID NO 5
<211> LENGTH: 9
<212> TYPE: PRT
<213> ORGANISM: Artificial Sequence
<220> FEATURE:
<223> OTHER INFORMATION: Peptide
<220> FEATURE:
<221> NAME/KEY: VARIANT
<222> LOCATION: 3, 5, 7, 9
<223> OTHER INFORMATION: Xaa = Any amino acid
<220> FEATURE:
<221> NAME/KEY: VARIANT
<222> LOCATION: 8
<223> OTHER INFORMATION: Xaa = L, F or I

<400> SEQUENCE: 5

Gly Gly Xaa Gly Xaa Asp Xaa Xaa Xaa
1               5

<210> SEQ ID NO 6
<211> LENGTH: 14
<212> TYPE: PRT
<213> ORGANISM: Artificial Sequence
```

```
<220> FEATURE:
<223> OTHER INFORMATION: Peptide

<400> SEQUENCE: 6

Ile Gln Gln Leu Lys Asn Gln Ile Lys Gln Leu Leu Lys Gln
1               5                   10

<210> SEQ ID NO 7
<211> LENGTH: 11
<212> TYPE: PRT
<213> ORGANISM: Artificial Sequence
<220> FEATURE:
<223> OTHER INFORMATION: Peptide

<400> SEQUENCE: 7

Cys Cys Cys Cys Gly Gly Gly Ser Arg Gly Asp
1               5                   10

<210> SEQ ID NO 8
<211> LENGTH: 5
<212> TYPE: PRT
<213> ORGANISM: Artificial Sequence
<220> FEATURE:
<223> OTHER INFORMATION: Peptide
<220> FEATURE:
<221> NAME/KEY: VARIANT
<222> LOCATION: 4
<223> OTHER INFORMATION: Xaa = Any amino acid

<400> SEQUENCE: 8

Val Pro Gly Xaa Gly
1               5

<210> SEQ ID NO 9
<211> LENGTH: 26
<212> TYPE: PRT
<213> ORGANISM: Artificial Sequence
<220> FEATURE:
<223> OTHER INFORMATION: Peptide

<400> SEQUENCE: 9

Gly Ile Gly Ala Val Leu Lys Val Leu Thr Thr Gly Leu Pro Ala Leu
1               5                   10                  15

Ile Ser Trp Ile Lys Arg Lys Arg Gln Gln
            20                  25

<210> SEQ ID NO 10
<211> LENGTH: 16
<212> TYPE: PRT
<213> ORGANISM: Artificial Sequence
<220> FEATURE:
<223> OTHER INFORMATION: Peptide

<400> SEQUENCE: 10

Glu Ala Ala Leu Glu Ala Ala Leu Glu Leu Ala Ala Glu Leu Ala Ala
1               5                   10                  15

<210> SEQ ID NO 11
<211> LENGTH: 16
<212> TYPE: PRT
<213> ORGANISM: Artificial Sequence
<220> FEATURE:
<223> OTHER INFORMATION: Peptide

<400> SEQUENCE: 11

Lys Ala Ala Leu Lys Ala Ala Leu Lys Leu Ala Ala Lys Leu Ala Ala
1               5                   10                  15
```

<210> SEQ ID NO 12
<211> LENGTH: 16
<212> TYPE: PRT
<213> ORGANISM: Artificial Sequence
<220> FEATURE:
<223> OTHER INFORMATION: Peptide

<400> SEQUENCE: 12

Lys Ala Ala Leu Glu Ala Ala Leu Lys Leu Ala Glu Leu Ala Ala
1               5                   10                  15

<210> SEQ ID NO 13
<211> LENGTH: 16
<212> TYPE: PRT
<213> ORGANISM: Artificial Sequence
<220> FEATURE:
<223> OTHER INFORMATION: Peptide

<400> SEQUENCE: 13

Glu Ala Ala Leu Lys Ala Ala Leu Glu Leu Ala Ala Lys Leu Ala Ala
1               5                   10                  15

<210> SEQ ID NO 14
<211> LENGTH: 37
<212> TYPE: PRT
<213> ORGANISM: Artificial Sequence
<220> FEATURE:
<223> OTHER INFORMATION: Peptide

<400> SEQUENCE: 14

Cys Gly Gly Glu Ile Arg Ala Leu Lys Tyr Glu Ile Ala Arg Leu Lys
1               5                   10                  15

Gln Ala Ala Gln Ala Lys Ile Arg Ala Leu Glu Gln Lys Ile Ala Ala
            20                  25                  30

Leu Glu Gly Gly Cys
            35

<210> SEQ ID NO 15
<211> LENGTH: 15
<212> TYPE: PRT
<213> ORGANISM: Artificial Sequence
<220> FEATURE:
<223> OTHER INFORMATION: Peptide

<400> SEQUENCE: 15

Tyr Ile His Ala Leu His Arg Lys Ala Phe Ala Lys Ile Ala Arg
1               5                   10                  15

<210> SEQ ID NO 16
<211> LENGTH: 12
<212> TYPE: PRT
<213> ORGANISM: Artificial Sequence
<220> FEATURE:
<223> OTHER INFORMATION: Peptide

<400> SEQUENCE: 16

Leu Glu Arg His Ile Arg Ala Leu Glu His Ala Ala
1               5                   10

<210> SEQ ID NO 17
<211> LENGTH: 18
<212> TYPE: PRT
<213> ORGANISM: Artificial Sequence
<220> FEATURE:
<223> OTHER INFORMATION: Peptide

```
<400> SEQUENCE: 17

Tyr Leu Lys Ala Met Leu Glu Ala Met Ala Lys Leu Met Ala Lys Leu
1               5                   10                  15

Met Ala

<210> SEQ ID NO 18
<211> LENGTH: 15
<212> TYPE: PRT
<213> ORGANISM: Artificial Sequence
<220> FEATURE:
<223> OTHER INFORMATION: Peptide
<220> FEATURE:
<221> NAME/KEY: VARIANT
<222> LOCATION: 7
<223> OTHER INFORMATION: Xaa = a-aminoisobutyric acid

<400> SEQUENCE: 18

Glu Ala Cys Ala Arg Val Xaa Ala Ala Cys Glu Ala Ala Arg Gln
1               5                   10                  15

<210> SEQ ID NO 19
<211> LENGTH: 36
<212> TYPE: PRT
<213> ORGANISM: Artificial Sequence
<220> FEATURE:
<223> OTHER INFORMATION: Peptide

<400> SEQUENCE: 19

Arg Val Ile Glu Lys Thr Asn Glu Lys Phe His Gln Ile Glu Lys Glu
1               5                   10                  15

Phe Ser Glu Val Glu Gly Arg Ile Gln Asp Leu Glu Lys Tyr Val Glu
                20                  25                  30

Asp Thr Lys Ile
            35

<210> SEQ ID NO 20
<211> LENGTH: 15
<212> TYPE: PRT
<213> ORGANISM: Artificial Sequence
<220> FEATURE:
<223> OTHER INFORMATION: Peptide

<400> SEQUENCE: 20

Glu Leu Ala Leu Lys Ala Lys Ala Glu Leu Glu Leu Lys Ala Gly
1               5                   10                  15

<210> SEQ ID NO 21
<211> LENGTH: 15
<212> TYPE: PRT
<213> ORGANISM: Artificial Sequence
<220> FEATURE:
<223> OTHER INFORMATION: Peptide

<400> SEQUENCE: 21

Glu Leu Leu Ala Lys Lys Ala Leu Glu Ala Glu Ala Leu Lys Gly
1               5                   10                  15

<210> SEQ ID NO 22
<211> LENGTH: 13
<212> TYPE: PRT
<213> ORGANISM: Artificial Sequence
<220> FEATURE:
<223> OTHER INFORMATION: Peptide

<400> SEQUENCE: 22
```

```
Glu Trp Ala Val Val Leu Val Ala Glu Ala Lys His Gln
1               5                   10
```

<210> SEQ ID NO 23
<211> LENGTH: 14
<212> TYPE: PRT
<213> ORGANISM: Artificial Sequence
<220> FEATURE:
<223> OTHER INFORMATION: Peptide

<400> SEQUENCE: 23

```
Trp Gly Lys Ile Gln Lys Leu Lys Ile Ala Lys Val Phe Lys
1               5                   10
```

<210> SEQ ID NO 24
<211> LENGTH: 15
<212> TYPE: PRT
<213> ORGANISM: Artificial Sequence
<220> FEATURE:
<223> OTHER INFORMATION: Peptide

<400> SEQUENCE: 24

```
Lys Val Ile Lys Cys Lys Ala Ala Val Leu Trp Glu Glu Lys Lys
1               5                   10                  15
```

<210> SEQ ID NO 25
<211> LENGTH: 20
<212> TYPE: PRT
<213> ORGANISM: Artificial Sequence
<220> FEATURE:
<223> OTHER INFORMATION: Peptide

<400> SEQUENCE: 25

```
Ile Ile Pro Thr Ala Gln Glu Thr Trp Leu Gly Val Leu Thr Ile Met
1               5                   10                  15

Glu His Thr Val
            20
```

<210> SEQ ID NO 26
<211> LENGTH: 19
<212> TYPE: PRT
<213> ORGANISM: Artificial Sequence
<220> FEATURE:
<223> OTHER INFORMATION: Peptide

<400> SEQUENCE: 26

```
Leu Ser Gly Gly Ile Asp Val Val Ala His Glu Leu Thr His Ala Val
1               5                   10                  15

Thr Asp Tyr
```

<210> SEQ ID NO 27
<211> LENGTH: 18
<212> TYPE: PRT
<213> ORGANISM: Artificial Sequence
<220> FEATURE:
<223> OTHER INFORMATION: Peptide

<400> SEQUENCE: 27

```
Pro Ala Val His Ala Ser Leu Asp Lys Phe Leu Ser Ser Val Ser Thr
1               5                   10                  15

Val Leu
```

<210> SEQ ID NO 28
<211> LENGTH: 15

```
<212> TYPE: PRT
<213> ORGANISM: Artificial Sequence
<220> FEATURE:
<223> OTHER INFORMATION: Peptide

<400> SEQUENCE: 28

Gly Tyr Gln Cys Gly Thr Ile Thr Ala Lys Asn Val Thr Ala Asn
1               5                   10                  15

<210> SEQ ID NO 29
<211> LENGTH: 15
<212> TYPE: PRT
<213> ORGANISM: Artificial Sequence
<220> FEATURE:
<223> OTHER INFORMATION: Peptide

<400> SEQUENCE: 29

Val Ala Glu Ala Lys Val Ala Glu Ala Lys Val Ala Glu Ala Lys
1               5                   10                  15

<210> SEQ ID NO 30
<211> LENGTH: 17
<212> TYPE: PRT
<213> ORGANISM: Artificial Sequence
<220> FEATURE:
<223> OTHER INFORMATION: Peptide

<400> SEQUENCE: 30

Glu Thr Ala Thr Lys Ala Glu Leu Leu Ala Lys Tyr Glu Ala Thr His
1               5                   10                  15

Lys

<210> SEQ ID NO 31
<211> LENGTH: 17
<212> TYPE: PRT
<213> ORGANISM: Artificial Sequence
<220> FEATURE:
<223> OTHER INFORMATION: Peptide
<220> FEATURE:
<221> NAME/KEY: VARIANT
<222> LOCATION: 12
<223> OTHER INFORMATION: Xaa = p-phenylazo-L-phenylalanine

<400> SEQUENCE: 31

Glu Thr Ala Thr Lys Ala Glu Leu Leu Ala Lys Xaa Glu Ala Thr His
1               5                   10                  15

Lys

<210> SEQ ID NO 32
<211> LENGTH: 33
<212> TYPE: PRT
<213> ORGANISM: Artificial Sequence
<220> FEATURE:
<223> OTHER INFORMATION: Peptide
<220> FEATURE:
<221> NAME/KEY: VARIANT
<222> LOCATION: 14
<223> OTHER INFORMATION: Xaa = D or N
<220> FEATURE:
<221> NAME/KEY: VARIANT
<222> LOCATION: 19
<223> OTHER INFORMATION: Xaa = E or Q

<400> SEQUENCE: 32

Ile Gly Lys Leu Lys Glu Glu Ile Asp Lys Leu Asn Arg Xaa Leu Asp
1               5                   10                  15

Asp Met Xaa Asp Glu Asn Glu Gln Leu Lys Gln Glu Asn Lys Thr Leu
```

-continued

```
                 20                  25                  30

Leu

<210> SEQ ID NO 33
<211> LENGTH: 8
<212> TYPE: PRT
<213> ORGANISM: Artificial Sequence
<220> FEATURE:
<223> OTHER INFORMATION: Peptide

<400> SEQUENCE: 33

Lys Val Val Gly Lys Leu Thr Arg
 1               5

<210> SEQ ID NO 34
<211> LENGTH: 14
<212> TYPE: PRT
<213> ORGANISM: Artificial Sequence
<220> FEATURE:
<223> OTHER INFORMATION: Peptide

<400> SEQUENCE: 34

Glu Ile Ala Gln Leu Glu Tyr Glu Ile Ser Gln Leu Glu Gln
 1               5                  10

<210> SEQ ID NO 35
<211> LENGTH: 14
<212> TYPE: PRT
<213> ORGANISM: Artificial Sequence
<220> FEATURE:
<223> OTHER INFORMATION: Peptide

<400> SEQUENCE: 35

Lys Ile Ala Gln Leu Lys Tyr Lys Ile Ser Gln Leu Lys Gln
 1               5                  10

<210> SEQ ID NO 36
<211> LENGTH: 21
<212> TYPE: PRT
<213> ORGANISM: Artificial Sequence
<220> FEATURE:
<223> OTHER INFORMATION: Peptide

<400> SEQUENCE: 36

Glu Ile Ala Gln Leu Glu Tyr Glu Ile Ser Gln Leu Glu Gln Glu Ile
 1               5                  10                  15

Gln Ala Leu Glu Ser
         20

<210> SEQ ID NO 37
<211> LENGTH: 21
<212> TYPE: PRT
<213> ORGANISM: Artificial Sequence
<220> FEATURE:
<223> OTHER INFORMATION: Peptide

<400> SEQUENCE: 37

Lys Ile Gln Ala Leu Lys Gln Lys Ile Ser Gln Leu Lys Trp Lys Ile
 1               5                  10                  15

Gln Ser Leu Lys Gln
         20

<210> SEQ ID NO 38
<211> LENGTH: 21
<212> TYPE: PRT
```

```
<213> ORGANISM: Artificial Sequence
<220> FEATURE:
<223> OTHER INFORMATION: Peptide

<400> SEQUENCE: 38

Gln Ala Thr Asn Arg Asn Thr Asp Gly Ser Thr Asp Tyr Gly Ile Leu
1               5                   10                  15
Gln Ile Asn Ser Arg
            20

<210> SEQ ID NO 39
<211> LENGTH: 24
<212> TYPE: PRT
<213> ORGANISM: Artificial Sequence
<220> FEATURE:
<223> OTHER INFORMATION: Peptide

<400> SEQUENCE: 39

Lys Leu Glu Ala Leu Tyr Val Leu Gly Phe Phe Gly Phe Phe Thr Leu
1               5                   10                  15
Gly Ile Met Leu Ser Tyr Ile Arg
            20

<210> SEQ ID NO 40
<211> LENGTH: 24
<212> TYPE: PRT
<213> ORGANISM: Artificial Sequence
<220> FEATURE:
<223> OTHER INFORMATION: Peptide

<400> SEQUENCE: 40

Lys Leu Glu Ala Leu Tyr Val Leu Gly Phe Phe Gly Phe Phe Thr Leu
1               5                   10                  15
Gly Ile Met Leu Ser Tyr Ile Arg
            20

<210> SEQ ID NO 41
<211> LENGTH: 12
<212> TYPE: PRT
<213> ORGANISM: Artificial Sequence
<220> FEATURE:
<223> OTHER INFORMATION: Peptide

<400> SEQUENCE: 41

Phe Lys Phe Glu Phe Lys Phe Glu Phe Lys Phe Glu
1               5                   10

<210> SEQ ID NO 42
<211> LENGTH: 12
<212> TYPE: PRT
<213> ORGANISM: Artificial Sequence
<220> FEATURE:
<223> OTHER INFORMATION: Peptide

<400> SEQUENCE: 42

Phe Lys Phe Gln Phe Lys Phe Gln Phe Lys Phe Gln
1               5                   10

<210> SEQ ID NO 43
<211> LENGTH: 20
<212> TYPE: PRT
<213> ORGANISM: Artificial Sequence
<220> FEATURE:
<223> OTHER INFORMATION: Peptide

<400> SEQUENCE: 43
```

Val Lys Val Lys Val Lys Thr Lys Val Pro Pro Thr Lys Val Lys Thr
1               5                   10                  15

Lys Val Lys Val
            20

<210> SEQ ID NO 44
<211> LENGTH: 16
<212> TYPE: PRT
<213> ORGANISM: Artificial Sequence
<220> FEATURE:
<223> OTHER INFORMATION: Peptide

<400> SEQUENCE: 44

Phe Glu Phe Glu Phe Lys Phe Lys Phe Glu Phe Glu Phe Lys Phe Lys
1               5                   10                  15

<210> SEQ ID NO 45
<211> LENGTH: 20
<212> TYPE: PRT
<213> ORGANISM: Artificial Sequence
<220> FEATURE:
<223> OTHER INFORMATION: Peptide

<400> SEQUENCE: 45

Val Lys Val Lys Val Lys Val Lys Val Pro Pro Thr Lys Val Lys Val
1               5                   10                  15

Lys Val Lys Val
            20

<210> SEQ ID NO 46
<211> LENGTH: 41
<212> TYPE: PRT
<213> ORGANISM: Artificial Sequence
<220> FEATURE:
<223> OTHER INFORMATION: Peptide

<400> SEQUENCE: 46

Glu Ile Ala Gln His Glu Lys Glu Ile Gln Ala Ile Glu Lys Lys Ile
1               5                   10                  15

Ala Gln His Glu Tyr Lys Ile Gln Ala Ile Glu Lys Ile Ala Gln
            20                  25                  30

His Lys Glu Lys Ile Gln Ala Ile Lys
        35                  40

<210> SEQ ID NO 47
<211> LENGTH: 11
<212> TYPE: PRT
<213> ORGANISM: Artificial Sequence
<220> FEATURE:
<223> OTHER INFORMATION: Peptide

<400> SEQUENCE: 47

Gln Gln Lys Phe Gln Phe Gln Phe Glu Gln Gln
1               5                   10

<210> SEQ ID NO 48
<211> LENGTH: 11
<212> TYPE: PRT
<213> ORGANISM: Artificial Sequence
<220> FEATURE:
<223> OTHER INFORMATION: Peptide

<400> SEQUENCE: 48

Gln Gln Arg Phe Glu Trp Glu Phe Glu Gln Gln

<210> SEQ ID NO 49
<211> LENGTH: 15
<212> TYPE: PRT
<213> ORGANISM: Artificial Sequence
<220> FEATURE:
<223> OTHER INFORMATION: Peptide

<400> SEQUENCE: 49

Cys Lys Gln Leu Glu Asp Lys Ile Glu Glu Leu Leu Ser Lys Ala
 1               5                  10                  15

<210> SEQ ID NO 50
<211> LENGTH: 14
<212> TYPE: PRT
<213> ORGANISM: Artificial Sequence
<220> FEATURE:
<223> OTHER INFORMATION: Peptide

<400> SEQUENCE: 50

Ala Cys Lys Gln Leu Glu Asp Lys Ile Glu Glu Leu Ser Lys
 1               5                  10

<210> SEQ ID NO 51
<211> LENGTH: 2
<212> TYPE: PRT
<213> ORGANISM: Artificial Sequence
<220> FEATURE:
<223> OTHER INFORMATION: Peptide

<400> SEQUENCE: 51

Phe Phe
 1

<210> SEQ ID NO 52
<211> LENGTH: 12
<212> TYPE: PRT
<213> ORGANISM: Artificial Sequence
<220> FEATURE:
<223> OTHER INFORMATION: Peptide

<400> SEQUENCE: 52

Gly Asn Asp Tyr Glu Asp Arg Tyr Tyr Arg Glu Asn
 1               5                  10

<210> SEQ ID NO 53
<211> LENGTH: 14
<212> TYPE: PRT
<213> ORGANISM: Artificial Sequence
<220> FEATURE:
<223> OTHER INFORMATION: Peptide

<400> SEQUENCE: 53

Met Tyr Arg Tyr Pro Asn Gln Val Tyr Tyr Arg Pro Val Cys
 1               5                  10

<210> SEQ ID NO 54
<211> LENGTH: 31
<212> TYPE: PRT
<213> ORGANISM: Artificial Sequence
<220> FEATURE:
<223> OTHER INFORMATION: Peptide

<400> SEQUENCE: 54

Pro His Pro Gly Gly Ser Asn Trp Gly Gln Pro His Pro Gly Gly Ser
 1               5                  10                  15

```
Asn Trp Gly Gln Pro His Pro Gly Gly Ser Asn Trp Gly Gln Gly
            20                  25                  30
```

<210> SEQ ID NO 55
<211> LENGTH: 18
<212> TYPE: PRT
<213> ORGANISM: Artificial Sequence
<220> FEATURE:
<223> OTHER INFORMATION: Peptide
<220> FEATURE:
<221> NAME/KEY: VARIANT
<222> LOCATION: 1
<223> OTHER INFORMATION: Xaa = 2,20-bipyridine

<400> SEQUENCE: 55

```
Xaa Ala Ala Gly Glu Leu Ala Gln Lys Leu Glu Gln Ala Leu Gln Lys
1               5                   10                  15

Leu Ala
```

<210> SEQ ID NO 56
<211> LENGTH: 16
<212> TYPE: PRT
<213> ORGANISM: Artificial Sequence
<220> FEATURE:
<223> OTHER INFORMATION: Peptide

<400> SEQUENCE: 56

```
Ala Glu Ala Glu Ala Lys Ala Lys Ala Glu Ala Glu Ala Lys Ala Lys
1               5                   10                  15
```

<210> SEQ ID NO 57
<211> LENGTH: 16
<212> TYPE: PRT
<213> ORGANISM: Artificial Sequence
<220> FEATURE:
<223> OTHER INFORMATION: Peptide

<400> SEQUENCE: 57

```
Arg Ala Arg Ala Asp Ala Asp Ala Arg Ala Arg Ala Asp Ala Asp Ala
1               5                   10                  15
```

<210> SEQ ID NO 58
<211> LENGTH: 12
<212> TYPE: PRT
<213> ORGANISM: Artificial Sequence
<220> FEATURE:
<223> OTHER INFORMATION: Peptide

<400> SEQUENCE: 58

```
Lys Leu Asp Leu Lys Leu Asp Leu Lys Leu Asp Leu
1               5                   10
```

<210> SEQ ID NO 59
<211> LENGTH: 16
<212> TYPE: PRT
<213> ORGANISM: Artificial Sequence
<220> FEATURE:
<223> OTHER INFORMATION: Peptide

<400> SEQUENCE: 59

```
Arg Ala Asp Ala Arg Ala Asp Ala Arg Ala Asp Ala Arg Ala Asp Ala
1               5                   10                  15
```

<210> SEQ ID NO 60
<211> LENGTH: 16
<212> TYPE: PRT

```
<213> ORGANISM: Artificial Sequence
<220> FEATURE:
<223> OTHER INFORMATION: Peptide

<400> SEQUENCE: 60

Arg Ala Arg Ala Asp Ala Asp Ala Arg Ala Arg Ala Asp Ala Asp Ala
 1               5                   10                  15
```